United States Patent
Takeda et al.

(10) Patent No.: US 10,520,733 B2
(45) Date of Patent: Dec. 31, 2019

(54) VIRTUAL IMAGE DISPLAY DEVICE INCLUDING FIRST AND SECOND LIGHT GUIDING UNITS AND MANUFACTURING METHOD THEREOF

(71) Applicant: SEIKO EPSON CORPORATION, Tokyo (JP)

(72) Inventors: Takashi Takeda, Suwa (JP); Akira Komatsu, Tatsuno-machi (JP); Masayuki Takagi, Matsumoto (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 15/710,008

(22) Filed: Sep. 20, 2017

(65) Prior Publication Data
US 2018/0095283 A1 Apr. 5, 2018

(30) Foreign Application Priority Data

Sep. 30, 2016 (JP) .................. 2016-192989

(51) Int. Cl.
| | |
|---|---|
| G02B 5/18 | (2006.01) |
| G02B 27/01 | (2006.01) |
| G02B 1/11 | (2015.01) |
| F21V 8/00 | (2006.01) |

(52) U.S. Cl.
CPC ............ *G02B 27/0172* (2013.01); *G02B 1/11* (2013.01); *G02B 6/003* (2013.01); *G02B 6/005* (2013.01); *G02B 6/0076* (2013.01); G02B 2027/0116 (2013.01); G02B 2027/0125 (2013.01);
(Continued)

(58) Field of Classification Search
CPC ...... G02B 5/18; G02B 5/1814; G02B 5/1842; G02B 5/1861; G02B 5/32; G02B 27/0025; G02B 27/0037; G02B 27/005; G02B 27/0056; G02B 27/0062; G02B 27/01; G02B 27/001; G02B 27/0103; G02B 2027/011; G02B 2027/0112; G02B 2027/0116; G02B 27/017; G02B 27/0172; G02B 27/0174; G02B 27/10; G02B 27/1006; G02B 27/1086; G02B 27/42;
(Continued)

(56) References Cited

U.S. PATENT DOCUMENTS

| | | | | |
|---|---|---|---|---|
| 8,903,207 B1 * | 12/2014 | Brown | ............... | G02B 27/0103 359/1 |
| 10,191,288 B2 * | 1/2019 | Singer | .................. | G02B 5/1819 |

FOREIGN PATENT DOCUMENTS

| | | |
|---|---|---|
| JP | 2009-186794 A | 8/2009 |
| JP | 2012-098324 A | 5/2012 |

* cited by examiner

*Primary Examiner* — Arnel C Lavarias
(74) *Attorney, Agent, or Firm* — Oliff PLC

(57) ABSTRACT

A virtual image display device includes a display light guiding unit, and an image forming unit that emits image light to the display light guiding unit, the display light guiding unit includes a first light guiding unit that guides image light corresponding to a first angle of view, and a second light guiding unit that guides image light corresponding to a second angle of view, among angles of view of image light emitted from the image forming unit, and the first light guiding unit and the second light guiding unit respectively include incident side diffraction elements that take the image light beams into the inside, and emission side diffraction elements that emit the image light beams to the outside.

15 Claims, 16 Drawing Sheets

(52) U.S. Cl.
CPC ............... *G02B 2027/0132* (2013.01); *G02B 2027/0174* (2013.01)

(58) Field of Classification Search
CPC ............ G02B 27/4205; G02B 27/4211; G02B 27/4216
USPC ....... 359/558, 566, 569, 570, 571, 572, 574, 359/575, 576, 8, 13, 14, 629, 630, 631
See application file for complete search history.

VIRTUAL IMAGE DISPLAY DEVICE INCLUDING FIRST AND SECOND LIGHT GUIDING UNITS AND MANUFACTURING METHOD THEREOF

BACKGROUND

1. Technical Field

The present invention relates to a virtual image display device such as a head mount display which is mounted on a head and used, and a manufacturing method thereof.

2. Related Art

In recent years, various types of virtual image display devices have been proposed, such as a head mount display, which enable the formation and observation of virtual images.

JP-A-2009-186794 discloses an optical device including a first light guiding plate having a first diffraction grating for incidence and a second diffraction grating for emission, and a second light guiding plate having a third diffraction grating for incidence and a fourth diffraction grating for emission, parallel light of two colors of red, blue, and green is guided by one light guiding plate of the first and second light guiding plates, and parallel light of the other one color is guided by the other light guiding plate.

In JP-A-2012-98324, it is noted that in a light guiding plate having a plurality of reflecting surfaces, image light is blocked by a part of the plurality of reflecting surfaces, in a case where the widths of the plurality of reflecting surfaces are widened in order to realize a high angle of view, and thus there is a possibility that image unevenness occurs and the image becomes dark. Therefore, JP-A-2012-98324 discloses a virtual image display device in which an image is separated by two light guiding units, and image light beams led to respective light guiding units are joined by each image extracting unit having a plurality of reflecting surfaces to form one virtual image.

However, in a case of an optical system in which angle conversion is performed by a diffraction element such as a hologram element and light is guided through a light guiding member, when trying to obtain a wide angle of view, the wavelength of light to be diffracted is changed as the light moves to the outside which is the corner of the screen, which may cause color unevenness. In a case where angle conversion is performed by a diffraction element and light is guided through a light guiding member, for example, light from other image areas is reflected at different diffraction angle from the diffraction angle of light from the image center, and there is a possibility that the total reflection condition is not satisfied, and consequently the angle of view narrows.

SUMMARY

An advantage of some aspects of the invention is to widen the angle of view while preventing occurrence of color unevenness, in a virtual image display device which performs angle conversion by a diffraction element and guides image light to a light guide system.

A virtual image display device according to an aspect of the invention includes a display light guiding unit; and an image forming unit that emits image light to the display light guiding unit, in which the display light guiding unit includes a first light guiding unit that guides image light corresponding to a first angle of view, and a second light guiding unit that guides image light corresponding to a second angle of view, among angles of view of image light emitted from the image forming unit, and the first light guiding unit and the second light guiding unit each include an incident side diffraction element that takes the image light into the inside, and an emission side diffraction element that emits the image light to the outside.

In the virtual image display device, the display light guiding unit includes the first light guiding unit that is in charge of the first angle of view and guides image light, and the second light guiding unit that is in charge of the second angle of view and guides image light, so the entire angle of view is shared by a plurality of diffraction elements (a plurality of incident side diffraction elements or a plurality of emission side diffraction elements), and thus it is easy to secure the total reflection condition and thus the angle of view as a whole can be widened, or it is possible to suppress the occurrence of color unevenness even in a case of increasing an angle of view.

In a specific aspect of the invention, in the virtual image display device, the display light guiding unit is formed of a single light guiding member, and in the single light guiding member, transmission type diffraction elements are provided as the incident side diffraction element and the emission side diffraction element of the first light guiding unit on the observer side, and reflection type diffraction elements are provided as the incident side diffraction element and the emission side diffraction element of the second light guiding unit on the outside. In this case, since the single light guiding member is used in common as the first and second light guiding units, the optical system of the virtual image display device can be simplified.

In another aspect of the invention, the display light guiding unit includes a first light guiding member provided with the first light guiding unit, and a second light guiding member provided with the second light guiding unit. In this case, since the first and second light guiding units have independent structures by the first and second light guiding member, it is easy to prevent the image light of the first angle of view and the image light of the second angle of view from interacting with each other to secure image quality easily.

In still another aspect of the invention, at least one of an air layer, a low refractive index layer, and an AR layer is provided on the surfaces of the first light guiding member and the second light guiding member.

In still another aspect of the invention, in order to collectively input image light to both the first and second light guiding units, a single image forming unit as the image forming unit, and a single projection optical system corresponding to the single image forming unit are provided. In this case, the image forming unit and the accompanying projection optical system can have simple configurations.

In still another aspect of the invention, in order to individually input image light to each of the first and second light guiding units, a pair of image forming units as the image forming unit, and a pair of projection optical systems corresponding to the pair of image forming units are provided. In this case, since image light from the individual image forming units can be independently input to the first and second light guiding units, the degree of freedom of arrangement of the image forming units and the projection optical systems is increased.

In still another aspect of the invention, in order to input image light to each of the first and second light guiding units, a pair of image forming units as the image forming unit, and a single projection optical system corresponding to the pair of image forming units are provided. In this case, each image forming unit having a relatively small area can be obtained.

In still another aspect of the invention, the first and second angles of view are respectively set between 20° and 45°. By setting the first and second angles of view to 20° or more, it is possible to secure a relatively wide angle of view as a whole. By setting the first and second angles of view to 45° or less, the range of the reflection angle or the propagation angle at each light guiding unit is relatively narrowed so that the total reflection condition can be easily satisfied.

In still another aspect of the invention, the first and second light guiding units separate the angle of view of image light of at least one of three colors of R, G, and B into the first angle of view and the second angle of view, and guide the image light. In this case, at the time of color image display, at least an angle of view of a specific color can be widened to enhance image quality.

In still another aspect of the invention, the incident side diffraction element and the emission side diffraction element are holograms. The hologram includes a volume hologram in addition to a general hologram.

In still another aspect of the invention, the incident side diffraction element and the emission side diffraction element are diffraction gratings. The diffraction grating includes a surface relief diffraction grating.

In still another aspect of the invention, a pair of incident side diffraction elements of the first and second light guiding units, or a pair of emission side diffraction elements of the first and second light guiding units have a common area for diffracting common image light, and the addition value of the diffraction efficiencies of the pair of diffraction elements in the common area is adjusted so as to be approximately equal to the diffraction efficiency of a single diffraction element in the non-common area. In this case, the image corresponding to the common area and the image corresponding to the non-common area can be displayed as a continuous and uniform image.

In still another aspect of the invention, in order to individually input image light to each of the first and second light guiding units, a pair of image forming units as the image forming unit, and a pair of projection optical systems corresponding to the pair of image forming units are provided. A pair of incident side diffraction elements of the first and second light guiding units, or a pair of emission side diffraction elements of the first and second light guiding units may have a common area for diffracting common image light, and in the image forming unit, the luminance of the image light of the common area may be adjusted. In this case, the image corresponding to the common area and the image corresponding to the non-common area can be continued in luminance, and uniformly displayed as a whole.

In still another aspect of the invention, two diffraction elements in the common area have substantially the same angle of incidence.

In still another aspect of the invention, a light guiding unit for the left eye and a light guiding unit for the right eye which guide the image light to the left and right eyes of the observer are provided as the display light guiding unit, and the diffraction efficiency is adjusted by the light guiding unit for the left eye and the light guiding unit for the right eye such that the diffraction efficiency in a case where the image light is observed by the observer becomes substantially uniform.

A manufacturing method of a virtual image display device according to another aspect of the invention is a manufacturing method of a virtual image display device including a display light guiding unit, and an image forming unit that emits image light to the display light guiding unit, in which the display light guiding unit includes a first light guiding unit that guides image light corresponding to a first angle of view, and a second light guiding unit that guides image light corresponding to a second angle of view, among angles of view of image light emitted from the image forming unit, the first light guiding unit and the second light guiding unit each include an incident side diffraction element that takes the image light into the inside, and an emission side diffraction element that emits the image light to the outside, a pair of incident side diffraction elements of the first and second light guiding units, or a pair of emission side diffraction elements of the first and second light guiding units have a common area for diffracting common image light, and the addition value of the diffraction efficiencies of the pair of diffraction elements in the common area is adjusted so as to be approximately equal to the diffraction efficiency of a single diffraction element in the non-common area.

In the virtual image display device according to the above manufacturing method, the angle of view of image light is shared by a plurality of diffraction elements, such that the angle of view as a whole can be widened, or the occurrence of color unevenness can be suppressed. Further, in the manufacturing method, since the addition value of the diffraction efficiencies of the pair of diffraction elements in the common area is adjusted so as to be approximately equal to the diffraction efficiency of the single diffraction element in the non-common area, the image corresponding to the common area and the image corresponding to the non-common area can be smoothly continued in luminance, and uniformly displayed as a whole.

In a specific aspect of the invention, in the manufacturing method of a virtual image display device, the incident side diffraction element or the emission side diffraction element is a hologram, and when the hologram is recorded, a diffraction efficiency is adjusted with a slope of the exposure intensity. In this case, the image corresponding to the common area and the image corresponding to the non-common area can easily be smoothly continued in luminance.

BRIEF DESCRIPTION OF THE DRAWINGS

The invention will be described with reference to the accompanying drawings, wherein like numbers reference like elements.

FIG. 5A illustrates a manufacturing method of a diffraction element of the optical system shown in FIG. 2 or the like.

FIG. 5B illustrates another manufacturing method of the diffraction element of the optical system shown in FIG. 2 or the like.

DESCRIPTION OF EXEMPLARY EMBODIMENTS

First Embodiment

A virtual image display device of a first embodiment according to the invention will be described below with reference to the drawings.

Figure 1:
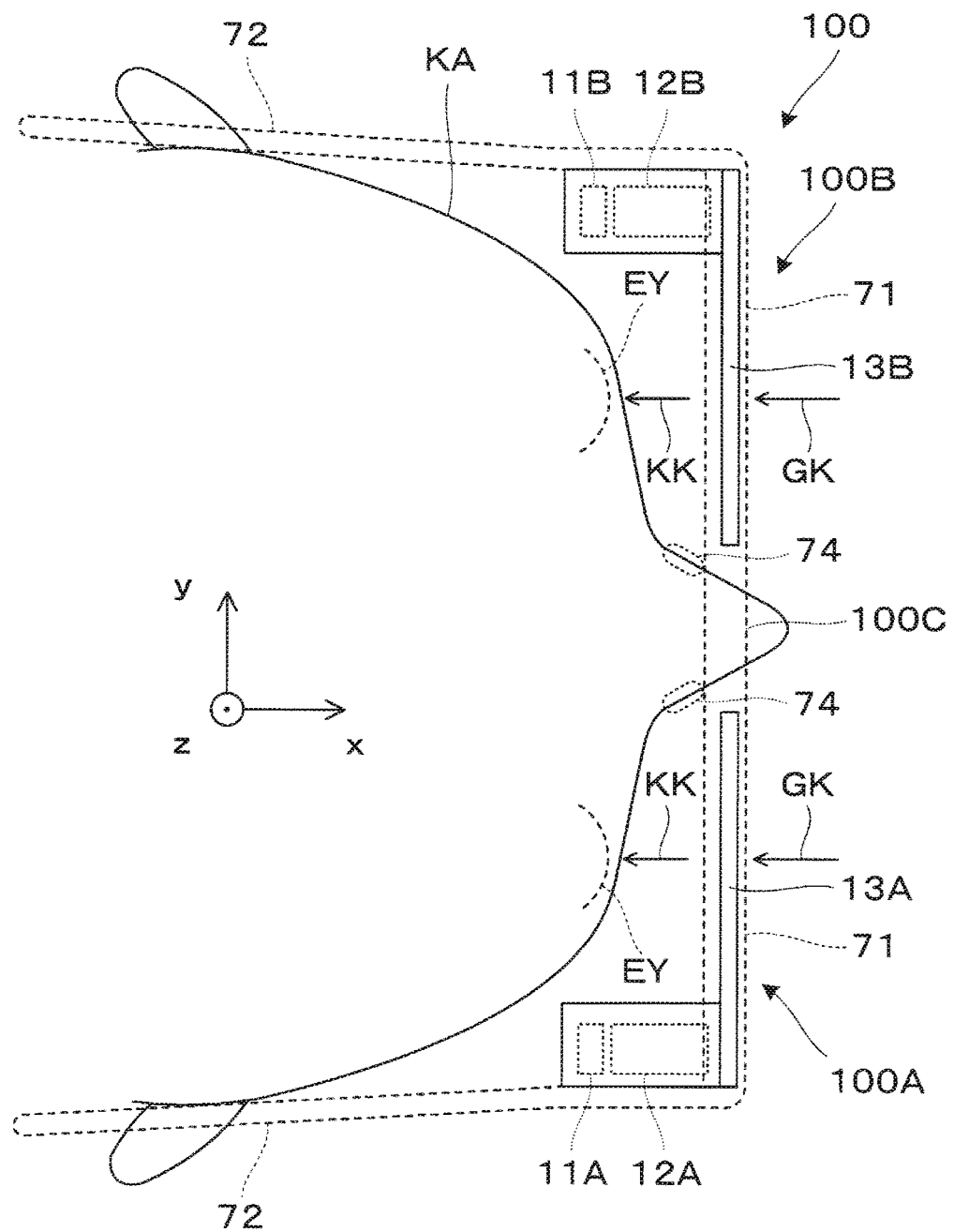
FIG. 1 is a plan view showing a virtual image display device according to a first embodiment.

A virtual image display device 100 shown in FIG. 1 is an eye glasses-type head mount display, and has a pair of left and right virtual image display units 100A and 100B. In the virtual image display device 100, an observer KA is made to recognize various images such as moving images and still images, by making image light KK forming a virtual image incident at the positions of both eyes EY of the observer KA who is the wearer, and the observer KA is made to observe an external image or a see-through image by allowing external light GK from the external image to be incident on the eyes EY of the observer KA. Both virtual image display units 100A and 100B are supported by a frame 100C which is a common holding portion, and by the frame 100C, the arrangement relationship between both virtual image display units 100A and 100B is maintained and the relative arrangement relationship between a plurality of optical components constituting each of the virtual image display units 100A and 100B is maintained. In addition, in FIGS. 1, and 2 are subsequent drawings which will be referred for a following description, x, y, and z refer to three axes of a Cartesian coordinate system.

The virtual image display unit 100A on the right side includes a display device 11A, a projection optical system 12A, and a display light guiding unit 13A. Here, the display light guiding unit 13A is also called a light guiding unit for the right eye. The virtual image display unit 100B on the left side includes a display device 11B, a projection optical system 12B, and a display light guiding unit 13B. Here, the display light guiding unit 13B is also called a light guiding unit for the left eye. In the following, the structure and function of the virtual image display unit 100A on the right side will be described, and the structure and the function of the virtual image display unit 100B on the left side are the same as the structure and the like of the virtual image display unit 100A on the right side, so the duplicated description thereof will be omitted.

Figure 2:
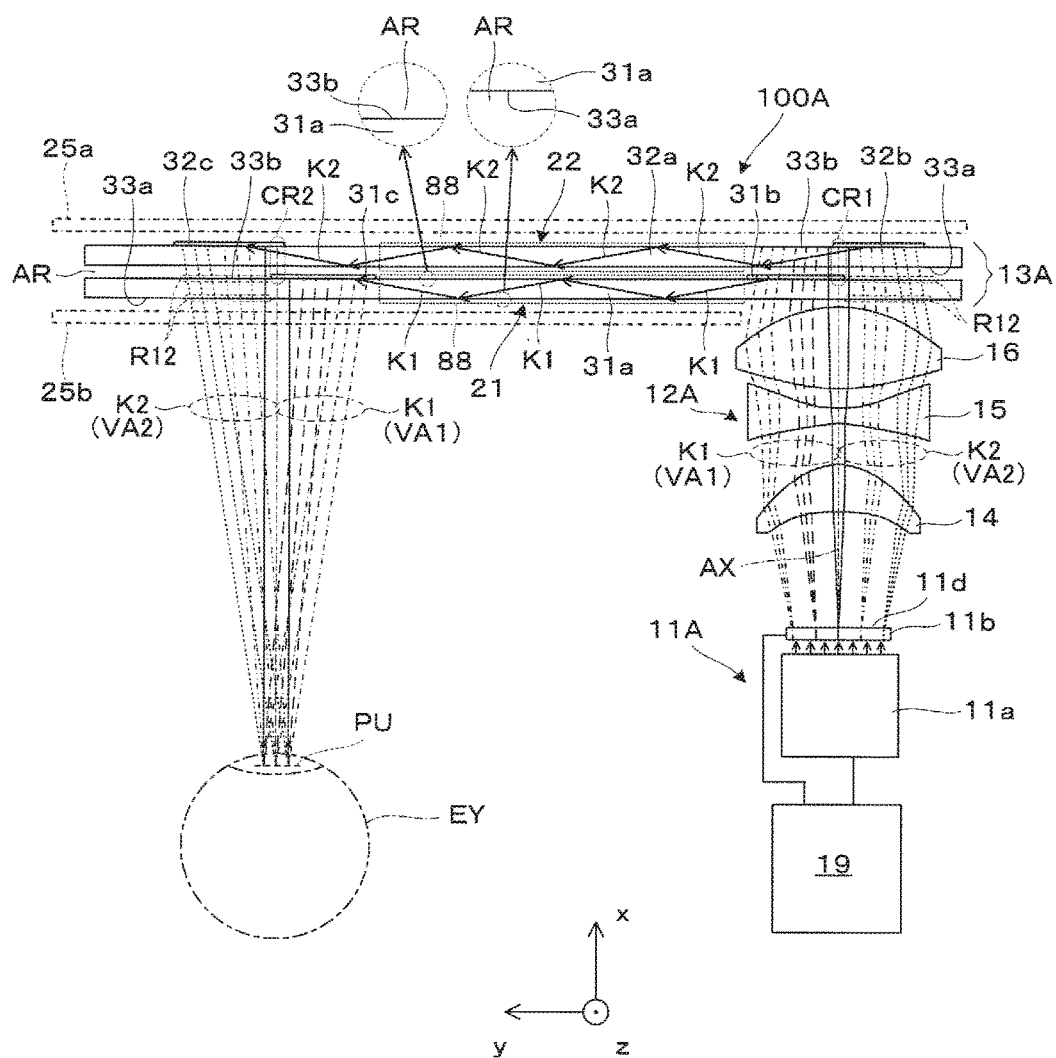
FIG. 2 is a plan sectional view illustrating a virtual image display unit on one side of the virtual image display device.

Referring to FIG. 2, the display device 11A of the virtual image display unit 100A on the right side is an image forming unit which emits the image light KK to the projection optical system 12A. The display device 11A is a single image forming unit common to first and second light guiding units 21 and 22 constituting the display light guiding unit 13A. The display device (image forming unit) 11A is driven by a drive circuit 19 operating under the control of a control device, not shown, and performs a display operation. The display device 11A is a combination of a lighting device 11a and a light modulation panel 11b, for example. The lighting device 11a includes a narrow-band light source corresponding to three colors of RGB, and an illumination optical system that collimates or homogenizes illumination light of three colors from the light source. For example, an LED, LD, or the like can be used as the light source of three colors. As the light modulation panel 11b, for example, a liquid crystal display panel can be used. In addition, the display device (image forming unit) 11A is not limited to the configuration including the lighting device 11a and the light modulation panel 11b, but may be a self-luminous type display panel, specifically an organic EL display panel or the like can be used.

The projection optical system 12A is a single projection optical system corresponding to the display device (image forming unit) 11A. The projection optical system 12A can be said to be a collimator from the point of view that the image light KK emitted from each point of the image formed on a display surface 11d of the display device 11A is a parallel ray. By the projection optical system 12A, the image light KK emitted from the display device 11A is converted into parallel light rays having angle information corresponding to the position on the display surface 11d. In other words, the projection optical system 12A can also be regarded as a reimaging system that converts an image formed on the display surface 11d of the display device 11A into a virtual image at infinity. The projection optical system 12A includes a plurality of lenses 14 to 16. The optical surfaces of these lenses 14 to 16 can be composed of any of a free-form surface, an aspheric surface, a spherical surface, and the like.

The display light guiding unit (light guiding unit for the right eye) 13A is an optical system for observing the image light KK formed by the projection optical system 12A with the eye EY. The display light guiding unit 13A includes the first light guiding unit 21 which is a first light guiding member that guides image light K1 corresponding to a first angle of view VA1 among the angle of views of the image light KK emitted from the display device (image forming unit) 11A, and the second light guiding unit 22 which is a second light guiding member that guides image light K2 corresponding to a second angle of view VA2. The first angle of view VA1 is set, for example, in a range of 20° to 45° and the second angle of view VA2 is also set in a range of 20° to 45°, for example, thereby ensuring an angle of view of 40° to 90° as a whole. In FIG. 2, the first light guiding unit 21 is disposed on the inside which is the eye side EY and the second light guiding unit 22 is disposed on the outside. However, it is also possible that the second light guiding unit 22 is disposed on the inside and the first light guiding unit 21 is disposed on the outside.

The first light guiding unit (first light guiding member) 21 and the second light guiding unit (second light guiding member) 22 are flat plates, and are supported by the supporter (not shown) to be disposed in parallel to each other.

The first light guiding unit (first light guiding member) 21 handles the first angle of view VA1 on the left half as viewed from the eye EY, and includes a light guiding plate 31a which is a parallel plate, an incident side diffraction element 31b that takes the image light K1 into the inside of the light guiding plate 31a, and an emission side diffraction element 31c that emits the image light K1 to the outside of the light guiding plate 31a.

The light guiding plate 31a among them is made of an optically transparent material such as glass or a resin material, and makes the image light K1 corresponding to the first angle of view VA1 be internally propagated or guided mainly in the y direction. The light guiding plate 31a has an inner surface 33a and an outer surface 33b as main surfaces or surfaces, and the inner surface 33a and the outer surface 33b are processed into mirror surfaces. The inner surface 33a and the outer surface 33b are light guiding surfaces parallel to each other, and have a function of maintaining the propagation angle or reflection angle of the image light K1 propagating in the light guiding plate 31a. As shown in the enlarged manner in FIG. 2, an air layer AR is provided on the surfaces of the light guiding plate 31a, that is, the inner surface 33a and the outer surface 33b to secure a total reflection angle equal to or larger than a critical angle.

The incident side diffraction element 31b makes the image light K1 of the first angle of view VA1, incident through the projection optical system 12A and the light guiding plate 31a, be diffracted to the light guiding plate 31a and be propagated through the light guiding plate 31a, and diffracts the image light K1 to convert the angle of incidence into a desired diffraction angle. Thus, the image light K1 reflected by the incident side diffraction element 31b after passing through the light guiding plate 31a satisfies the total reflection condition in the light guiding plate 31a. In other words, the angle of incidence on the inner surface 33a of the image light K1 diffracted and reflected by the incident side diffraction element 31b is larger than the critical angle of propagation in the light guiding plate 31a. The incident side diffraction element 31b equivalently functions as a tilted mirror, and has a function of folding the optical path of the image light K1 in a direction in which the light can propagate in the light guiding plate 31a.

The incident side diffraction element 31b is a reflection type diffraction element, which is one of a hologram and a surface relief diffraction grating. In a case where the incident side diffraction element 31b is a hologram, it is preferable to use a volume hologram from the viewpoint of reducing color separation, and in particular, it is preferable to use a volume phase type hologram. In a case where the incident side diffraction element 31b is a surface relief diffraction grating, it is preferable to use a blazed grating from the viewpoint of light utilization efficiency. Here, the volume hologram is formed by recording hologram data as a lattice in a relatively thick recording medium, and in particular, the volume phase type hologram is formed by recording hologram data as a refractive index grating to increase the transmittance. The surface relief diffraction grating is formed by forming an uneven relief corresponding to an interference pattern on the thin film surface, and in particular, the blazed grating is formed by forming an uneven relief having a saw-tooth cross section shape to enhance the diffraction efficiency. Incidentally, the incident side diffraction element 31b can be a diffraction element that collectively performs diffraction of each color alone, but it can be formed by laminating a diffraction element for each color. Specifically, for example, holograms for respective colors R, G, and B can be bonded together to form the incident side diffraction element 31b.

The emission side diffraction element 31c extracts the image light K1, which is diffracted to the light guiding plate 31a by the incident side diffraction element 31b, and is propagated through the light guiding plate 31a, to the outside of the light guiding plate 31a, and diffracts the image light K1 to convert its propagation angle to a desired diffraction angle. Thus, the image light K1 incident on the emission side diffraction element 31c from the inside of the light guiding plate 31a is restored to have an exit angle equal to the original angle of incidence before being incident on the incident side diffraction element 31b. The emission side diffraction element 31c equivalently functions as a tilted mirror, and has a function of causing the image light K1 propagated in the light guiding plate 31a to be emitted to the eye EY side through the inner surface 33a and reproducing or projecting the enlarged virtual image corresponding to the image on the display surface 11d of the display device 11A in front of the eye EY. In addition, the emission side diffraction element 31c is also a reflection type diffraction element like the incident side diffraction element 31b, and is one of hologram and surface relief diffraction gratings. In other words, examples of the emission side diffraction element 31c can include a volume phase type hologram, a blazed grating, or the like.

As is apparent from the above, the incident side diffraction element 31b and the emission side diffraction element 31c have symmetry with each other, and color separation occurring at the incident side diffraction element 31b is compensated with color separation occurring at the emission side diffraction element 31c. Thus, even if the hologram or the surface relief diffraction grating constituting the incident side diffraction element 31b causes color separation, the color separation occurring at the first light guiding unit 21 as a whole can be reduced. Here, color separation is chromatic dispersion generated by each of the diffraction elements 31b and 31c, which means a difference in diffraction angles caused by a difference in wavelength.

The second light guiding unit (second light guiding member) 22 handles the second angle of view VA2 on the right half as viewed from the eye EY, and includes a light guiding plate 32a which is a parallel plate, an incident side diffraction element 32b that takes the image light K2 into the inside of the light guiding plate 32a, and an emission side diffraction element 32c that emits the image light K2 to the outside of the light guiding plate 32a.

The light guiding plate 32a, the incident side diffraction element 32b, and the emission side diffraction element 32c constituting the second light guiding unit 22 have basically the same functions as the light guiding plate 31a, the incident side diffraction element 31b, and the emission side diffraction element 31c constituting the first light guiding unit 21, but the specific arrangement and operation are different in handling the image light K2 corresponding to the second angle of view VA2.

The light guiding plate 32a is similar to the light guiding plate 31a of the first light guiding unit 21, is made of an optically transparent material such as glass or a resin material, and makes the image light K2 be internally propagated mainly in the y direction. The light guiding plate 32a has an inner surface 33a and an outer surface 33b as main surfaces or surfaces, and the inner surface 33a and the outer surface 33b are processed into mirror surfaces. The inner surface 33a and the outer surface 33b are light guiding surfaces parallel to each other, and have a function of maintaining the propagation angle or reflection angle of the image light K2 propagating in the light guiding plate 32a. An air layer is provided on the surfaces of the light guiding plate 32a, that is, the inner surface 33a and the outer surface 33b.

The incident side diffraction element 32b makes the image light K2 of the second angle of view VA2, incident through the projection optical system 12A and the light guiding plate 32a, be diffracted to the light guiding plate 32a and be propagated through the light guiding plate 32a, and diffracts the image light K2 to convert the angle of incidence into a desired diffraction angle. Thus, the image light K2 reflected by the incident side diffraction element 32b after passing through the light guiding plate 32a satisfies the total reflection condition in the light guiding plate 32a. In other words, the angle of incidence on the inner surface 33a of the image light K2 diffracted and reflected by the incident side diffraction element 32b is larger than the critical angle of the light guiding plate 32a. The incident side diffraction element 32b equivalently functions as a tilted mirror, and has a function of folding the optical path of the image light K2 in a direction in which the light can propagate in the light guiding plate 32a.

The incident side diffraction element 32b is a reflection type diffraction element, which is one of a hologram and a surface relief diffraction grating. In other words, examples of the incident side diffraction element 32b can include a volume phase type hologram, a blazed grating, or the like.

The emission side diffraction element 32c extracts the image light K2, which is diffracted to the light guiding plate 32a by the incident side diffraction element 32b, and propagated through the light guiding plate 32a, to the outside of the light guiding plate 32a, and diffracts the image light K2 to convert its propagation angle to a desired diffraction angle. Thus, the image light K2 incident on the emission side diffraction element 32c from the inside of the light guiding plate 32a is restored to have an exit angle equal to the original angle of incidence before being incident on the incident side diffraction element 32b. The emission side diffraction element 32c equivalently functions as a tilted mirror, and has a function of causing the image light K2 propagated in the light guiding plate 32a to be emitted to the eye EY side through the inner surface 33a and reproducing or projecting the enlarged virtual image corresponding to the image on the display surface 11d of the display device 11A in front of the eye EY.

The emission side diffraction element 32c is a reflection type diffraction element, which is one of a hologram and a surface relief diffraction grating. In other words, examples of the incident side diffraction element 32b can include a volume phase type hologram, a blazed grating, or the like.

As is apparent from the above, the incident side diffraction element 32b and the emission side diffraction element 32c have symmetry with each other, and color separation occurring at the incident side diffraction element 32b is compensated with color separation occurring at the emission side diffraction element 32c. Thus, even if the hologram or the surface relief diffraction grating constituting the incident side diffraction element 32b causes color separation, the color separation occurring at the second light guiding unit 22 as a whole can be reduced.

The image light K2 from the second light guiding unit 22 passes through the light guiding plate 31a of the first light guiding unit 21. Therefore, in particular, one of the low refractive index layer and the AR layer is formed instead of the air layer in a passing area R12 of the image light K2, in the surfaces 33a and 33b of the light guiding plate 31a. In addition, as long as the total reflection condition is satisfied with respect to the image light K2, the low refractive index layer, the AR layer, and the like can be formed in an area other than the passing area R12 of the second light guiding unit 22. Similarly, as long as the total reflection condition is satisfied with respect to the image light K1, the low refractive index layer, the AR layer, and the like can also be formed on the surfaces 33a and 33b of the first light guiding unit 21.

The emission side diffraction element 31c in the first light guiding unit 21 causes the image light K1 propagating through the light guiding plate 31a to be incident on a pupil PU of the eye EY as parallel light. At this time, the principal ray from one corner (corner on the left side in FIG. 2) on the display surface 11d of the display device 11A is incident on the pupil PU from the right front side. On the other hand, the emission side diffraction element 32c in the second light guiding unit 22 causes the image light K2 propagating through the light guiding plate 32a to be incident on the pupil PU of the eye EY as parallel light. At this time, the principal ray from the other corner (corner on the right side in FIG. 2) on the display surface 11d of the display device 11A is incident on the pupil PU from the left front side. In other words, by combining the image light beams K1 and K2 from the two emission side diffraction elements 31c and 32c, it is possible to observe the entire image formed on the display surface 11d without left and right breaks. At this time, if the incident side diffraction element 31b of the first light guiding unit 21 and the incident side diffraction element 32b of the second light guiding unit 22 are prevented from being separated from each other as seen from the normal direction of the inner surface 33a of the light guiding plate 31a to form a gap, missing or deterioration of images hardly occurs. In the illustrated example, a common area CR1 is provided in both incident side diffraction elements 31b and 32b, where they overlap with each other, thereby reliably avoiding chipping or deterioration in the image by the entire image light KK viewed from the eye EY. Details of the common area CR1 will be described in detail later.

For the same reasons, a common area CR2 is also provided between the emission side diffraction element 31c of the first light guiding unit 21 and the emission side diffraction element 32c of the second light guiding unit 22, where they overlap with each other. This makes it possible to reliably avoid chipping or deterioration in the image by the entire image light KK viewed from the eye EY.

Figure 3:
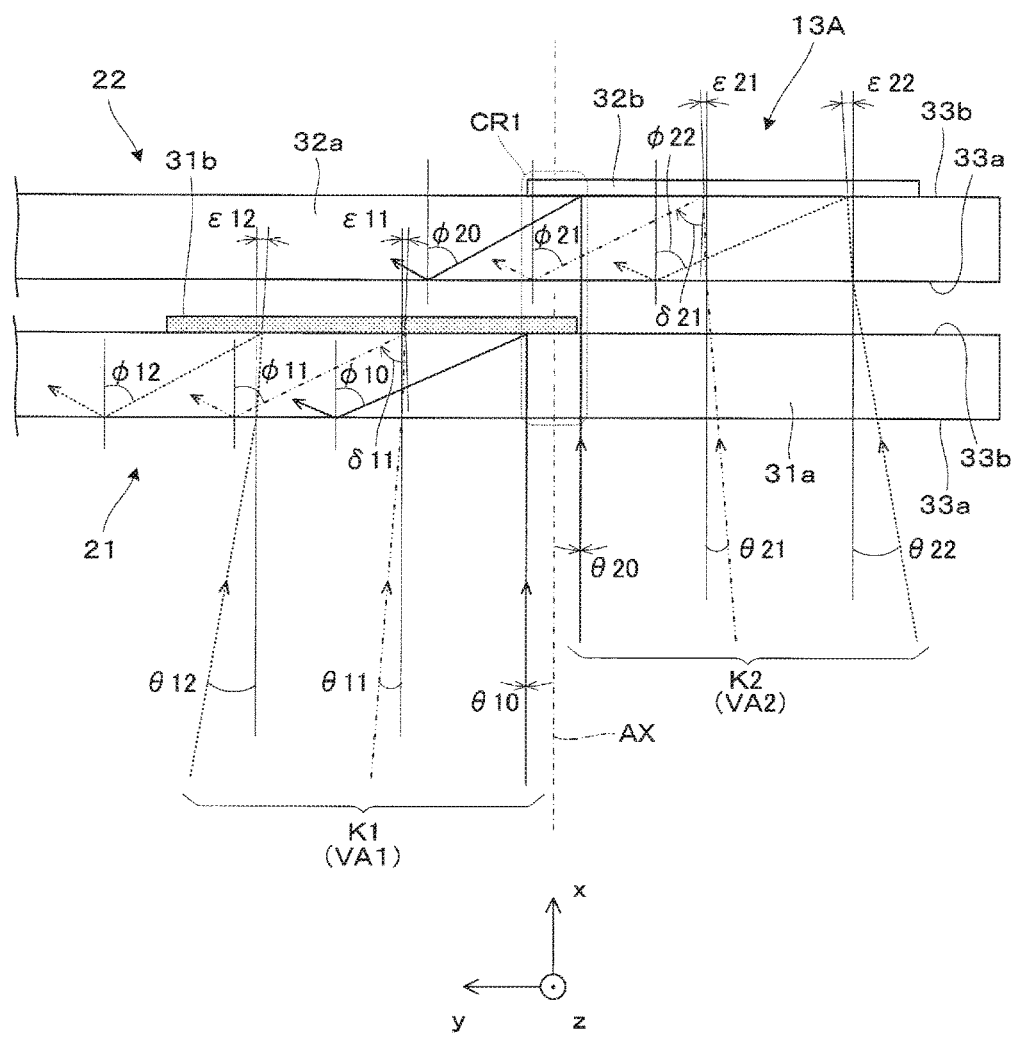
FIG. 3 is an enlarged view illustrating a propagation state of image light in an optical system shown in FIG. 2.

With reference to FIG. 3, the propagation angle, or the like of the image light KK will be described. An image light K1 with angles of incidence of 0° to 20° corresponding to angles of view $\theta 10$, $\theta 11$, and $\theta 12$ is incident on the first light guiding unit 21, with a half angle of view as 20°. Here, it is assumed that the angle of incidence is positive in the clockwise direction, and the maximum angle of incidence is 2.5 m ahead of the 80-inch screen. Assuming that the refractive index of the light guiding plate 31a is about 1.64 (critical angle of about 37.6°), the maximum refraction angle $\epsilon 12$ is about 12°, and the intermediate refraction angle $\epsilon 11$ is about 6°. The refraction angles $\epsilon 11$ and $\epsilon 12$ correspond to the angle of incidence on the incident side diffraction element 31b. The image light K1 with the minimum angle of view $\theta 10$ is diffracted by the incident side diffraction element 31b, and propagates through the light guiding plate 31a at the reflection angle or the propagation angle $\varphi 10$. Similarly, the image light K1 with the maximum angle of view $\theta 12$ in an absolute value propagates through the light guiding plate 31a at a propagation angle $\varphi 12$, and the image light K1 with an intermediate angle of view $\theta 11$ propagates through the light guiding plate 31a at a propagation angle $\varphi 11$. Here, the goal is to set the intermediate propagation angle $\varphi 11$ (corresponding to the screen center on the image light K1 side) to, for example, 55°. Therefore, if the diffraction angle is 79.5°, 61° ($\delta 11$), and 51° from the ray on the right side (optical axis AX side) of FIG. 3, the propagation angles $\varphi 10$, $\varphi 11$, and $\varphi 12$ are respectively 79.5°, 55°, and 39°, all propagation angles $\varphi 10$ to $\varphi 12$ are greater than the critical angle of about 37.6° and are in a practical range of 80° or less, such that the propagation loss disappears. The same applies to the second light guiding unit 22, and image light K2 having angles of incidence of 0° to −20° corresponding to angles of view θ20, θ21, and θ22 is incident. The maximum refraction angle ε22 in an absolute value is about −12°, and the intermediate refraction angle ε21 is about −6°. The goal is to set the intermediate propagation angle φ21 (corresponding to the screen center on the image light K2 side) to, for example, 55°. Therefore, if the diffraction angle is 40.5°, 49° (δ21), and 59° from the ray on the left side (optical axis AX side) of FIG. 3, the propagation angles φ20, φ21, and φ22 are respectively 40.5°, 55°, and 71°, all propagation angles φ20 to φ22 are greater than the critical angle of about 37.6° and are in a practical range of 80° or less, such that the propagation loss disappears. That is, it can be seen that the first light guiding unit 21 and the second light guiding unit 22 can cover a wide angle of view ±20° or 40°. Although not shown in FIG. 3, in a case where a half angle of view ±20° is to be secured with a single light guiding unit in the related art, with respect to the reflection angle or the propagation angle of the image light in the light guiding plate of the light guiding unit, the angle of incidence of the light guiding plate is smaller than the critical angle at the end of one angle of view, and thus propagation loss occurs; and the angle of incidence on the light guiding plate exceeds 90° at the end of the other angle of view, and the image light cannot propagate. In the above description, specific numerical values are used for explanation in order to simplify understanding, but in the device according to the invention, numerical values are not limited to such numerical values, and angular conditions of propagation can be set according to specifications and uses.

Returning to FIG. 2, with respect to the display device 11A, the projection optical system 12A, the incident side diffraction element 31b of the first light guiding unit 21, and the incident side diffraction element 32b of the second light guiding unit 22, it is possible to reverse the front and back sides thereof, and to dispose them on the outside. In other words, even if the display device 11A and the projection optical system 12A are disposed so as to be folded at symmetrical planes extending parallel to the yz plane in the middle of the light guiding plates 31a and 32a, the incident side diffraction element 31b is disposed on the inner surface 33a of the light guiding plate 31a, and the incident side diffraction element 32b is disposed on the inner surface 33a of the light guiding plate 32a, the same image formation becomes possible.

The first light guiding unit 21 and the second light guiding unit 22 are protected by being sandwiched between a pair of protective covers 25a and 25b. The protective covers 25a and 25b are parallel flat plates formed of a resin material having optical transparency, and an anti-reflection coating or the like can be applied to the surfaces.

Returning to FIG. 1 or the like, the frame 100C has a main body 71 made of metal or another rigid body that supports the virtual image display units 100A and 100B from the top, and a temple portion 72 made of elastic material extending from both ends of the main body. A pair of nose pads 74 are attached at the center of the main body 71.

With reference to FIG. 2, the optical paths of the image light beams K1 and K2 in the light guiding plates 31a and 32a will be described. The numbers of reflections of the image light beams K1 and K2 in the light guiding plates 31a and 32a can be matched or different, depending on the condition setting such as the thickness of the light guiding plates 31a and 32a. For example, in a case where it is assumed that the thicknesses of both light guiding plates 31a and 32a are equal and the diffraction angles of the incident side diffraction elements 31b and 32b of the light ray along the optical axis AX are equal, and the incident side diffraction elements 31b and 32b and the emission side diffraction elements 31c and 32c are disposed symmetrically with reference to a point where principal rays from respective lateral points along the y axis of the light modulation panel 11b intersect, the numbers of reflections of the image light beams K1 and K2 made be matched and the image light beams K1 and K2 from the incident side diffraction elements 31b and 32b can be incident on the emission side diffraction elements 31c and 32c without loss. Even in a case of matching the numbers of reflections of the image light beams K1 and K2 in the light guiding plates 31a and 32a, it is possible to make the thicknesses of the light guiding plates 31a and 32a different from each other by adjusting the diffraction angles in the incident side diffraction elements 31b and 32b or the like. On the other hand, in a case of making the numbers of reflections of the image light beams K1 and K2 in the light guiding plates 31a and 32a different, it is possible to appropriately make the thicknesses of the light guiding plates 31a and 32a different from each other, or appropriately make the diffraction angles in the incident side diffraction elements 31b and 32b or the like different from each other. In this case, the propagation angle of the diffracted light from both incident side diffraction elements 31b and 32b can be set relatively freely, and it is easy to broaden the angle of view as a whole. The occurrence of jumping of light rays on the inner and outer surfaces 33a and 33b is avoided by making the thicknesses of both the light guiding plates 31a and 32a sufficiently thin as compared with the size of the spot formed by the light flux from each point of the light modulation panel 11b on the incident side diffraction element 32b, and thus the image light beams K1 and K2 can also be extracted at any position of the light guiding plates 31a and 32a.

From the viewpoint of avoiding the interference between the light guiding plates 31a and 32a or the incident side diffraction elements 31b and 32b, it is possible to provide an appropriate difference between the thicknesses of the light guiding plates 31a and 32a, and an appropriate difference between the diffraction angles of the incident side diffraction elements 31b and 32b.

Figure 4:
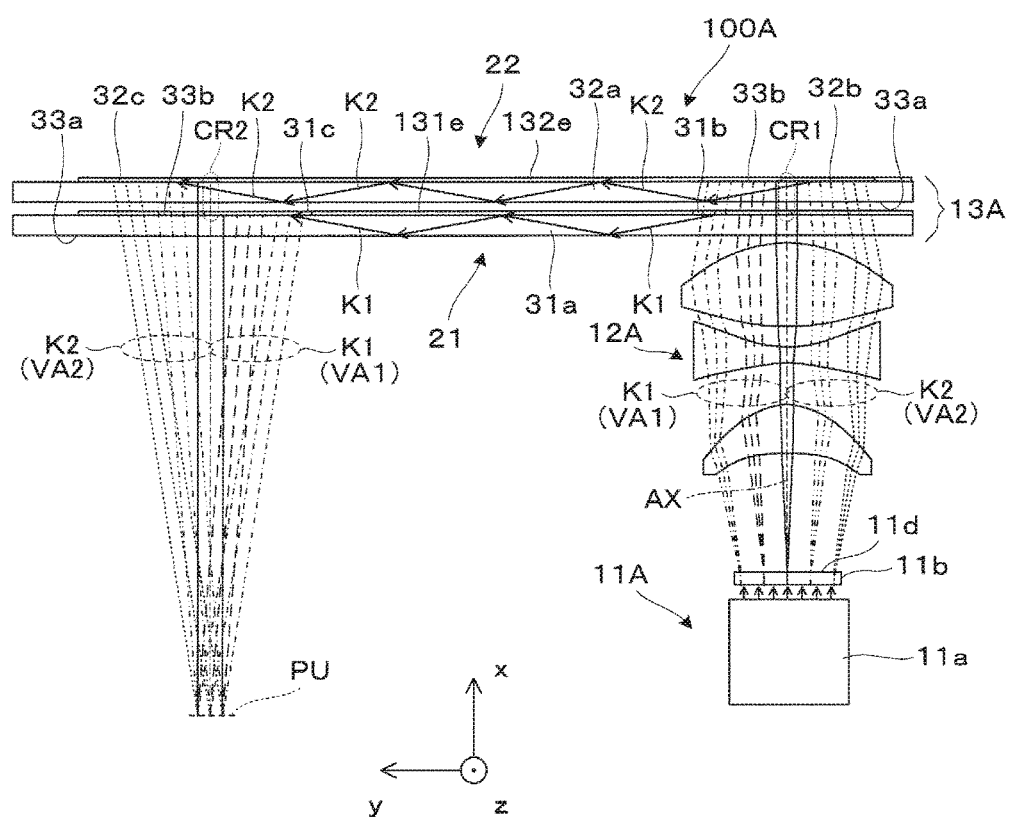
FIG. 4 illustrates a modification example of the optical system shown in FIG. 2.

FIG. 4 is a modification example of the first and second light guiding units 21 and 22 shown in FIG. 2. In this case, coating layers 131e and 132e of a uniform thickness are formed on the outer surfaces 33b of the light guiding plates 31a and 32a, the incident side diffraction element 31b and the emission side diffraction element 31c are embedded in the coating layer 131e of the first light guiding unit 21 side, and the incident side diffraction element 32b and the emission side diffraction element 32c are embedded in the coating layer 132e of the second light guiding unit 22 side. In this case, the coating layers 131e and 132e are mediums having a uniform refractive index, and the surfaces of the coating layers 131e and 132e are smooth surfaces satisfying the total reflection condition.

Figure 5A:
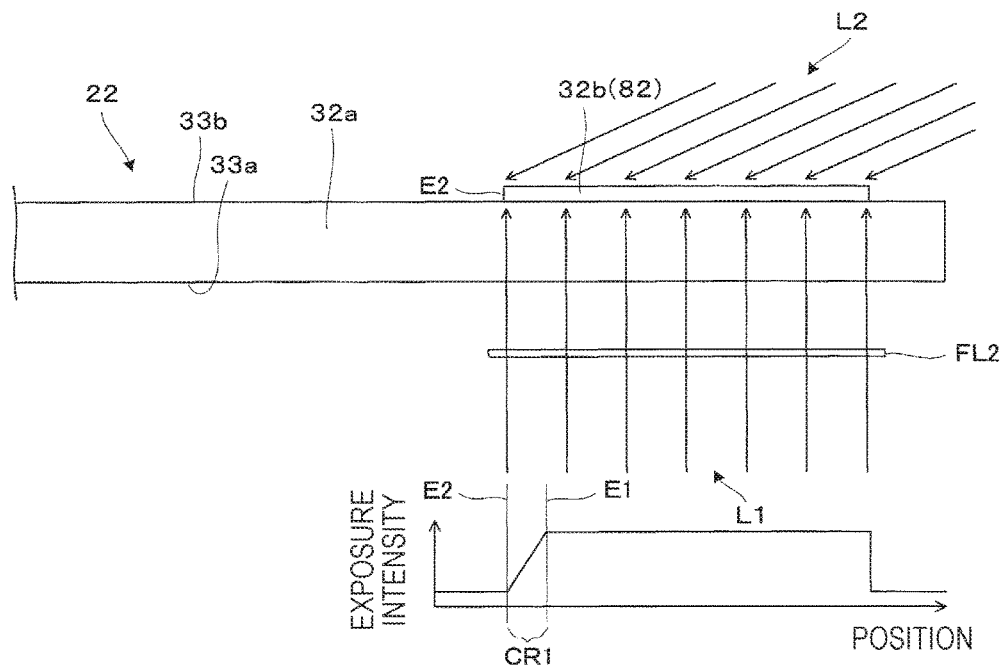
Figure 5B:
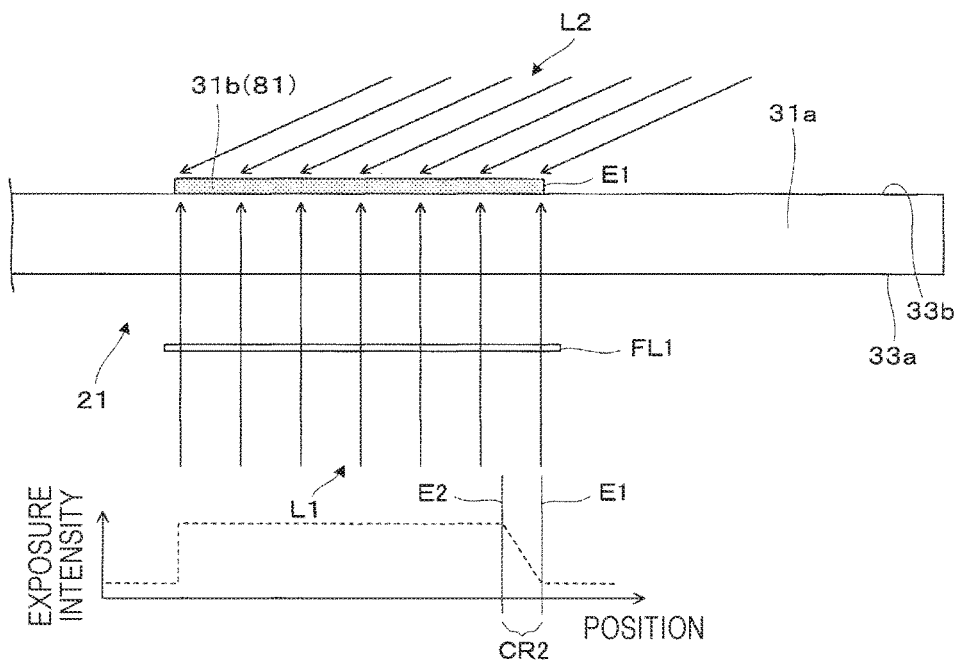

FIGS. 5A and 5B are diagrams illustrating the manufacturing method of the first and second light guiding units 21 and 22. As shown in FIG. 5A, the light guiding plate 32a to be the second light guiding unit 22 is prepared, and a hologram photosensitive material 82 is pasted or applied to a predetermined area of the outer surface 33b. Thereafter, the incident side diffraction element 32b is completed, by performing exposure in which a refractive index pattern is formed in the hologram photosensitive material 82 by irradiating the hologram photosensitive material 82 with reference light L2 which is a parallel light ray in a direction corresponding to the direction of the diffracted light, while the hologram photosensitive material 82 is irradiated with object light L1 which is a parallel light ray in a direction perpendicular to the inner surface 33a. In addition, as shown in FIG. 5B, the light guiding plate 31a to be the first light guiding unit 21 is prepared, and a hologram photosensitive material 81 is pasted or applied to a predetermined area of the outer surface 33b. Thereafter, the incident side diffraction element 31b is completed, by performing exposure in which a refractive index pattern is formed in the hologram photosensitive material 81 by irradiating the hologram photosensitive material 81 with the reference light L2 which is a parallel light ray in a direction corresponding to the direction of the diffracted light, while the hologram photosensitive material 81 is irradiated with the object light L1 which is a parallel light ray in a direction perpendicular to the inner surface 33a.

Upon exposure of the hologram photosensitive materials 81 and 82, the object light L1 or the reference light L2 is caused to have a distribution of illuminance or exposure intensity by using filters FL1, FL2, and the like, such that the impact on the common area CR1 where the incident side diffraction elements 31b and 32b overlap with each other is offset. Specifically, at the time of exposure of the hologram photosensitive material 82 corresponding to one incident side diffraction element 32b, the illuminance or the exposure intensity in the area from an edge E1 of the other incident side diffraction element 31b to an edge E2 of one incident side diffraction element 32b is gradually decreased, and the diffraction efficiency is gradually decreased in the same pattern. On the other hand, at the time of exposure of the hologram photosensitive material 81 corresponding to the other incident side diffraction element 31b, the illuminance or the exposure intensity in the area from the edge E2 of the one incident side diffraction element 32b to the edge E1 of the other incident side diffraction element 31b is gradually decreased, and the diffraction efficiency is gradually decreased in the same pattern. As a result, the addition value obtained by adding the diffraction efficiency of the incident side diffraction element 31b and the diffraction efficiency of the incident side diffraction element 32b is flat in the common area CR1, and is in a state of 100% based on the diffraction efficiency in the non-common area excluding the common area CR1. That is, the addition value of the diffraction efficiencies of the incident side diffraction elements 31b and 32b in the common area CR1 equals to the diffraction efficiency of each of the incident side diffraction elements 31b and 32b in the non-common area.

Figure 6A:
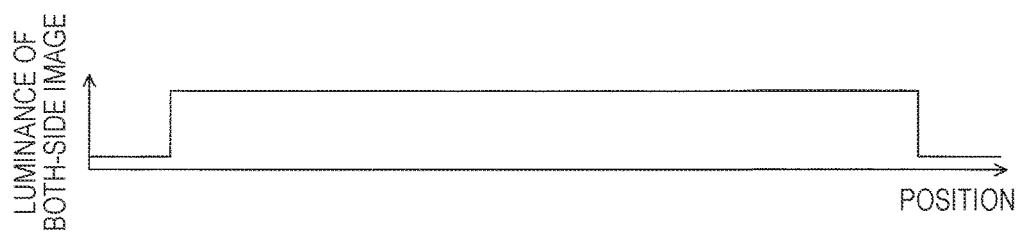
FIG. 6A illustrates luminance of image synthesized by first and second light guiding units.
Figure 6B:
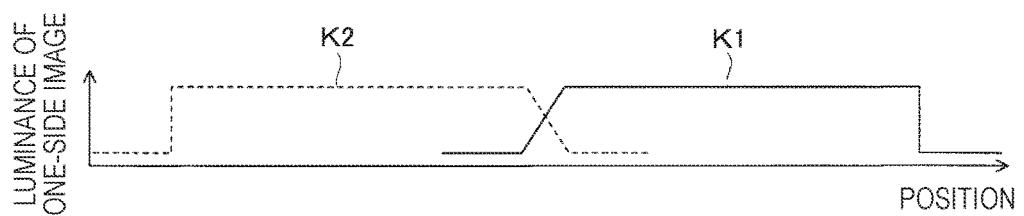
FIG. 6B illustrates luminances of individual images by the first and second light guiding units.

FIG. 6A is a diagram illustrating the luminance of an image synthesized by the first and second light guiding units 21 and 22. For convenience of explanation, the image is assumed to have no luminance pattern. FIG. 6B is a diagram illustrating the luminances of individual images by the first and second light guiding units 21 and 22. In this case, the image corresponding to the common area CR1 and the image corresponding to the non-common area are smoothly continuous in luminance.

Although not described in detail, the incident side diffraction element constituting the display light guiding unit 13B for the left eye is manufactured in the same way as the incident side diffraction elements 31b and 32b constituting the display light guiding unit 13A (the light guiding unit for the right eye). As a result, the diffraction efficiency is adjusted such that the diffraction efficiency in a case where the image light KK is observed by the observer KA by the display light guiding unit (light guiding unit for the right eye) 13A and the display light guiding unit (light guiding unit for the left eye) 13B becomes substantially uniform.

This is the description about the case where the incident side diffraction elements 31b and 32b have the common area CR1. However, in a case where the emission side diffraction elements 31c and 32c have the common area CR2, for example, on the emission side diffraction elements 31c and 32c, instead of the incident side diffraction elements 31b and 32b, the addition value of the diffraction efficiencies of the emission side diffraction elements 31b and 32b in the common area CR2 can be made equal to the diffraction efficiency of each of the emission side diffraction elements 31c and 32c in the non-common area. In this case, the same method as shown in FIGS. 5A and 5B can be used.

In the virtual image display device 100 of the first embodiment, the display light guiding units 13A and 13B each include the first light guiding unit 21 that is in charge of the first angle of view VA1 and guides image light, and the second light guiding unit 22 that is in charge of the second angle of view VA2 and guides image light, so the entire angle of view is shared by a plurality of diffraction elements (a plurality of incident side diffraction elements 31b and 32b or a plurality of emission side diffraction elements 31c and 32c), and thus it is easy to secure the total reflection condition and widen the angle of view as a whole, or it is possible to suppress the occurrence of color unevenness even in a case of increasing an angle of view.

Second Embodiment

A virtual image display device of a second embodiment will be described below. The virtual image display device according to the embodiment is a modification example of the virtual image display device of the first embodiment, and a description of parts common to the first embodiment will be omitted.

Figure 7:
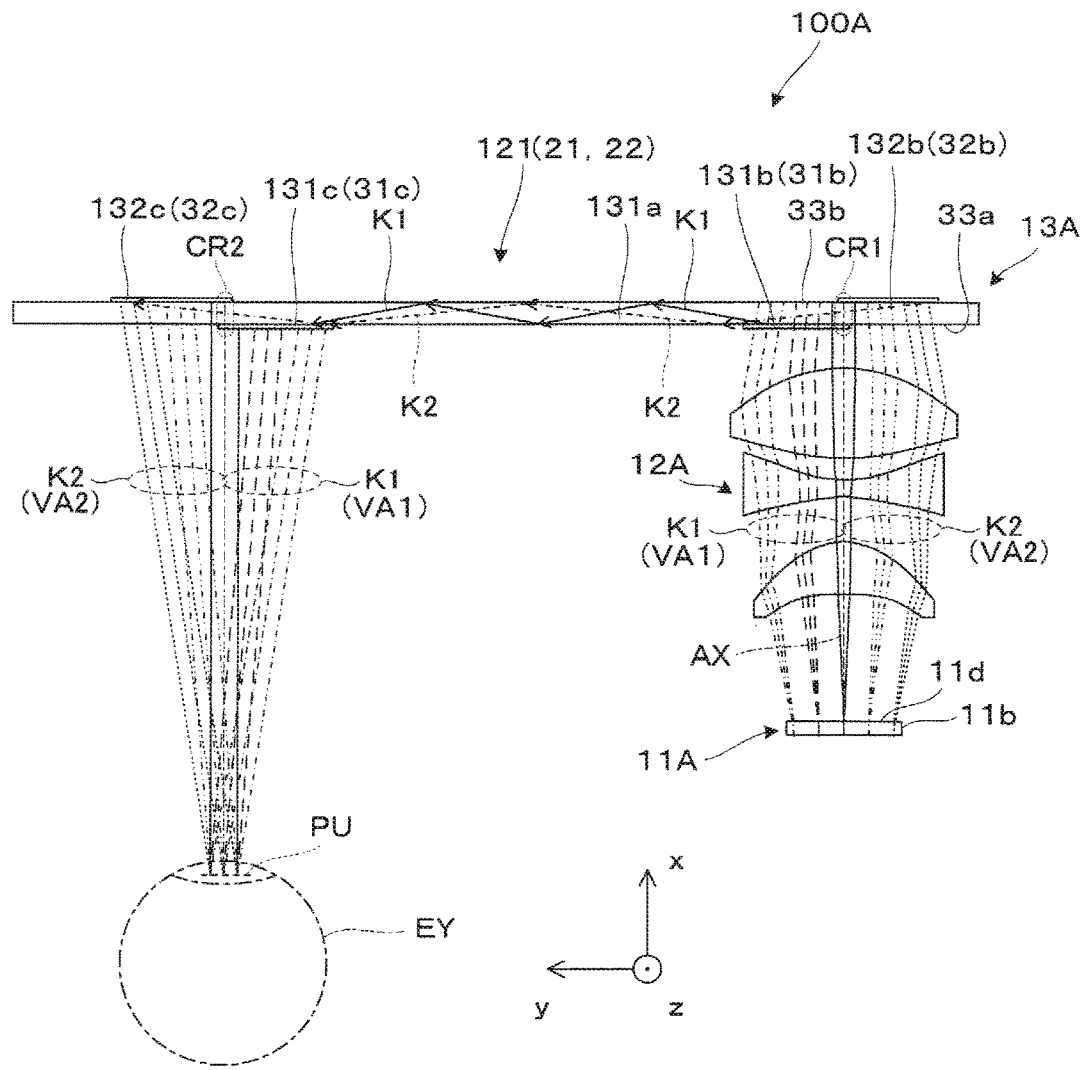
FIG. 7 is a plan sectional view illustrating a virtual image display device according to a second embodiment.

FIG. 7 is a diagram illustrating an optical configuration of a virtual image display unit 100A in the virtual image display device of the second embodiment. In this case, the display light guiding unit 13A is configured with a single light guiding member 121, and the single light guiding member 121 is obtained by combining and integrating the first and second light guiding units 21 and 22, which are separate bodies in the first embodiment. In the single light guiding member 121, a pair of transmission type diffraction elements 131b and 131c are provided on the observer side (−x side) of a light guiding plate 131a as the incident side diffraction element 31b and the emission side diffraction element 31c constituting the first light guiding unit 21, and a pair of reflection type diffraction elements 132b and 132c are provided on the outside (+x side) of the light guiding plate 131a as the incident side diffraction element 32b and the emission side diffraction element 32c constituting the second light guiding unit 22.

Here, in order to prevent the image light K2 from the incident side diffraction element 32b or the reflection type diffraction element 132b from being affected by the incident side diffraction element 31b, it is desirable that the image light K2 is not made incident on the incident side diffraction element 31b. Therefore, the diffraction angle of the image light K2 by the incident side diffraction element 32b is made relatively large so as not to be incident on the incident side diffraction element 31b.

According to the virtual image display device of the second embodiment, since the single light guiding member 121 is used in common as the first and second light guiding units 21 and 22, the optical system of the virtual image display device can be simplified.

Third Embodiment

A virtual image display device according to a third embodiment will be described below. The virtual image display device according to the embodiment is a modification example of the virtual image display device of the first embodiment, and a description of parts common to the first embodiment will be omitted.

Figure 8:
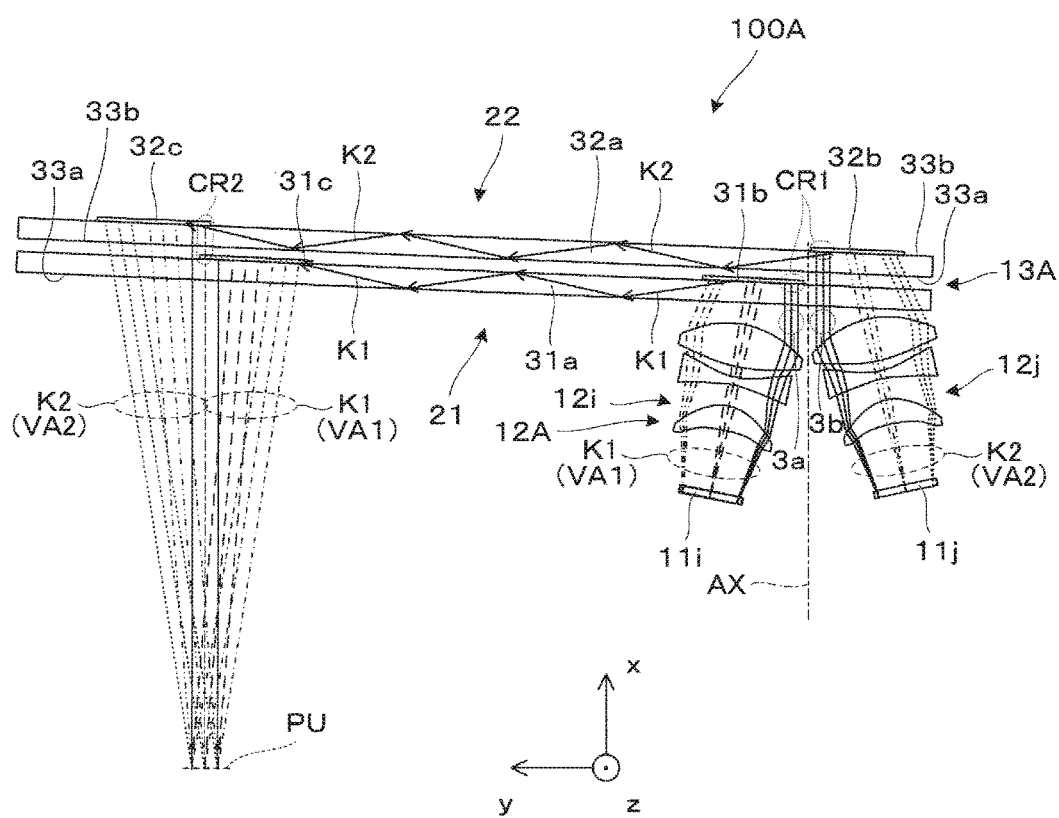
FIG. 8 is a plan sectional view illustrating a virtual image display device according to a third embodiment.

FIG. 8 is a diagram illustrating an optical configuration of a virtual image display unit 100A in the virtual image display device of the third embodiment. In this case, a pair of image forming units 11i and 11j as the display device (image forming unit) 11A and a pair of projection optical systems 12i and 12j corresponding to the pair of display devices (image forming units) 11i and 11j are included. The image light K1 from the image forming unit 11i on the left side of FIG. 8 is incident on the incident side diffraction element 31b of the first light guiding unit 21 through the projection optical system 12i, and the image light K2 from the image forming unit 11j on the right side of FIG. 8 is incident on the incident side diffraction element 32b of the second light guiding unit 22 through the projection optical system 12j. In this case, there is an overlap between the image by the image light K1 and the image by the image light K2, and overlapping light ray portions 3a and 3b are parallel to each other. The light ray portions 3a and 3b are incident on the common area CR1 of the pair of incident side diffraction elements 31b and 32b. In this case, the common area CR1 is spaced apart, but it is a part related to the display of the same image, and image light beams K1 and K2 having the same angle of incidence are incident on the common area CR1 of the incident side diffraction elements 31b and 32b. Misalignment between the image by the image light K1 and the image by the image light K2 can be prevented by making the light ray portions 3a and 3b parallel with each other. Further, in this case, since the image forming units 11i and 11j are independent of each other, the luminance of the image light beams K1 and K2 of the common area CR1 can be individually adjusted. That is, without adjusting the diffraction efficiencies of the incident side diffraction elements 31b and 32b or the like, the image corresponding to the common area CR1 and the image corresponding to the non-common area can be smoothly continued in luminance, and uniformly displayed as a whole. That is, in a case where the diffraction efficiencies of the incident side diffraction elements 31b and 32b are made uniform, the luminance of the image light of the common area CR1 is adjusted (for example, 50%) as compared with the luminance of the image light of the non-common area excluding the common area CR1, on the display devices (image forming units) 11i and 11j side, such that the luminance of the image light beams K1 and K2 in the common area CR1 that finally enters the eye EY of the observer KA can be matched with the luminance of the image light beams K1 and K2 in the non-common area. In addition, the adjustment of the diffraction efficiencies of the incident side diffraction elements 31b and 32b in the common area CR1 and the adjustment of the luminance of the image light from the display devices (image forming units) 11i and 11j may be combined.

In the example of FIG. 8, the overlapping light ray portions 3a and 3b are parallel to each other, and the image light beams K1 and K2 having substantially the same angle of incidence are incident on the common area CR1. However, there can be a slight difference in the angles of incidence of the image light beams K1 and K2 incident on the common area CR1 in consideration of the critical angle and other propagation conditions. In fact, assuming that the critical angle for all colors is 37.6°, in a case where the critical angle of green is about 40.5°, the degree of freedom of design for increasing or decreasing the diffraction angle of green by 2, 3° corresponding to the difference increases. Further, even if the color other than green (specifically red, for example) is larger than the critical angle for all colors, the diffraction angle can be increased or decreased for this color. That is, if the range is larger than the critical angle for all colors, the diffraction angle or the propagation angle can be adjusted for each color unit, and the diffraction angle or the propagation angle can be collectively and uniformly adjusted for all the colors. The incident side diffraction elements 31b and 32b which make diffraction angles different for each color or for all colors are not limited to hologram elements of a type which performs simultaneous exposure, but may be hologram elements of a composite type in which holograms for R, G, and B colors are pasted.

In the virtual image display device of the embodiment, the image light beams K1 and K2 from the pair of display devices (image forming units) 11i and 11j are individually input to the incident side diffraction elements 31b and 32b through the pair of projection optical systems 12i and 12j. That is, image light beams K1 and K2 from the individual image forming units 11i and 11j are processed independently for the first and second light guiding units 21 and 22. This increases the degree of freedom of arrangement of the image forming units 11i and 11j and the projection optical systems 12i and 12j.

Figure 9:
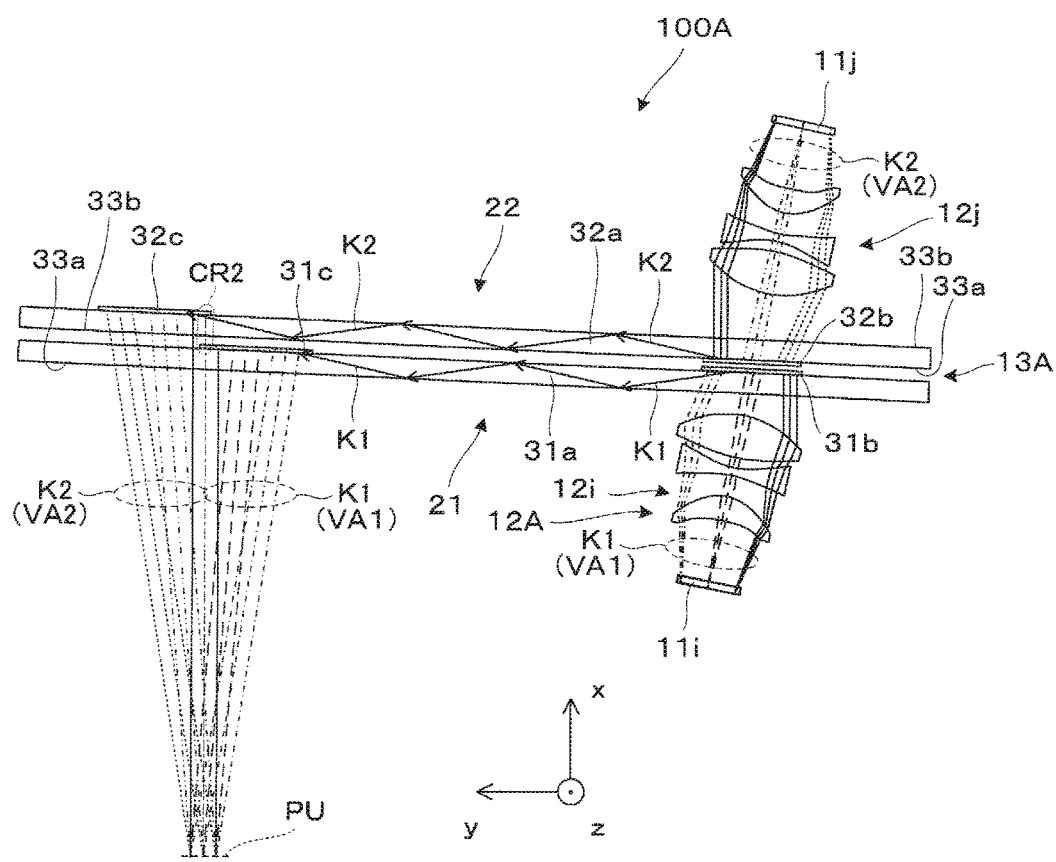
FIG. 9 is a plan view illustrating a modification example of the optical system shown in FIG. 8.

FIG. 9 is a diagram illustrating a modification example of the virtual image display device shown in FIG. 8. In this case, on the second light guiding unit 22 side, the image forming unit 11j and the projection optical system 12j are disposed on the outer side.

Figure 10:
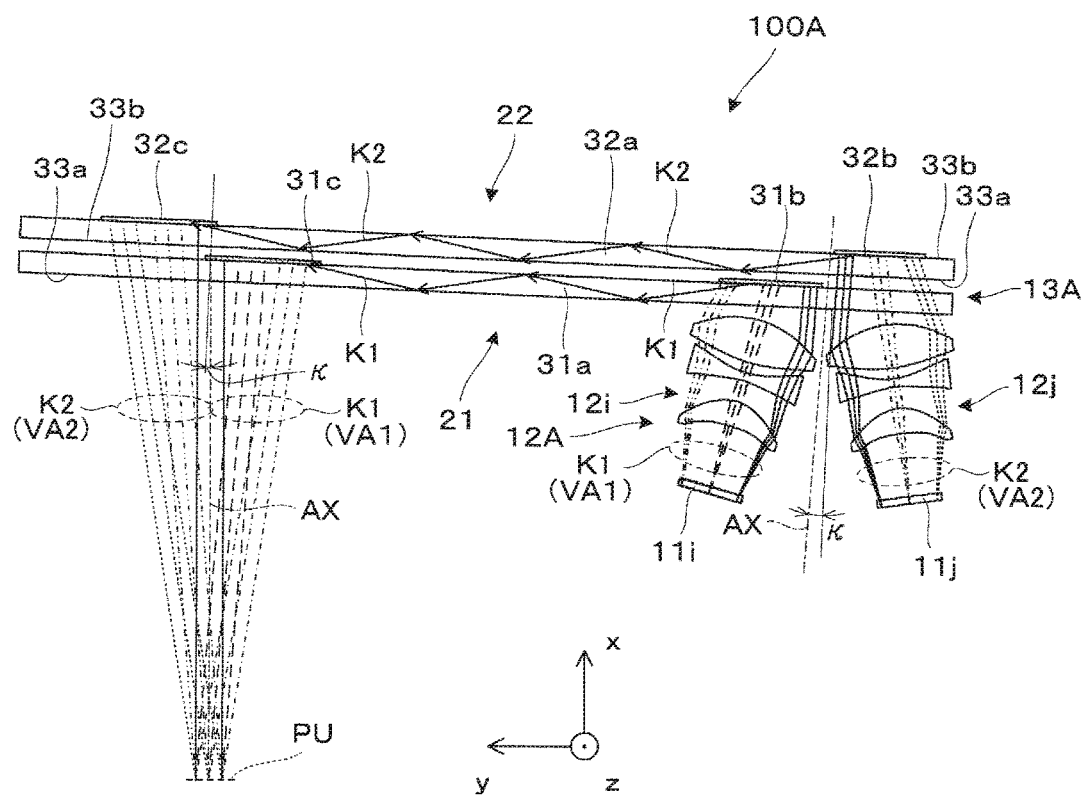
FIG. 10 is a plan view illustrating another modification example of the optical system shown in FIG. 8.

FIG. 10 is a diagram illustrating another modification example of the virtual image display device shown in FIG. 8. In this case, the optical axis AX common to the image forming unit 11i and the projection optical system 12i on the first light guiding unit 21 side and the image forming unit 11j and the projection optical system 12j on the second light guiding unit 22 side is inclined at an angle K with respect to the inner surfaces 33a of the light guiding plates 31a and 32a so as to compensate for the inclination of the light guiding plates 31a and 32a.

Fourth Embodiment

A virtual image display device of a fourth embodiment will be described below. The virtual image display device according to the embodiment is a modification example of the virtual image display device of the first embodiment, and a description of parts common to the first embodiment will be omitted.

Figure 11:
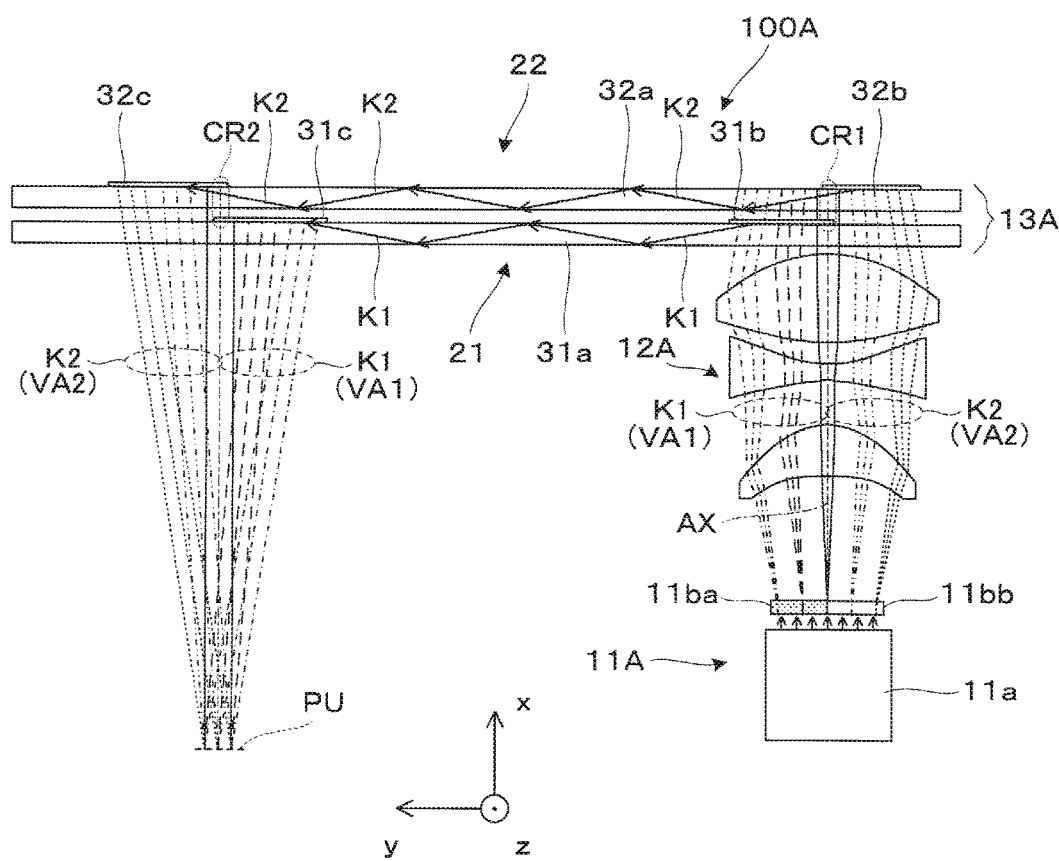
FIG. 11 is a plan view illustrating a virtual image display device according to a fourth embodiment.

FIG. 11 is a diagram illustrating an optical configuration of a virtual image display unit 100A in the virtual image display device of the fourth embodiment. In this case, in the display device 11A, a pair of light modulation panels 11ba and 11bb are used. In this case, the pair of light modulation panels 11ba and 11bb are a pair of image forming units. The image light K1 from one light modulation panel 11ba is incident on the incident side diffraction element 31b of the first light guiding unit 21 through a single common projection optical system 12A and the image light K2 from the other light modulation panel 11bb is incident on the incident side diffraction element 32b of the second light guiding unit 22 through the single common projection optical system 12A.

Fifth Embodiment

A virtual image display device of a fifth embodiment will be described below. The virtual image display device according to the embodiment is a modification example of the virtual image display device of the first embodiment, and a description of parts common to the first embodiment will be omitted.

Figure 12:
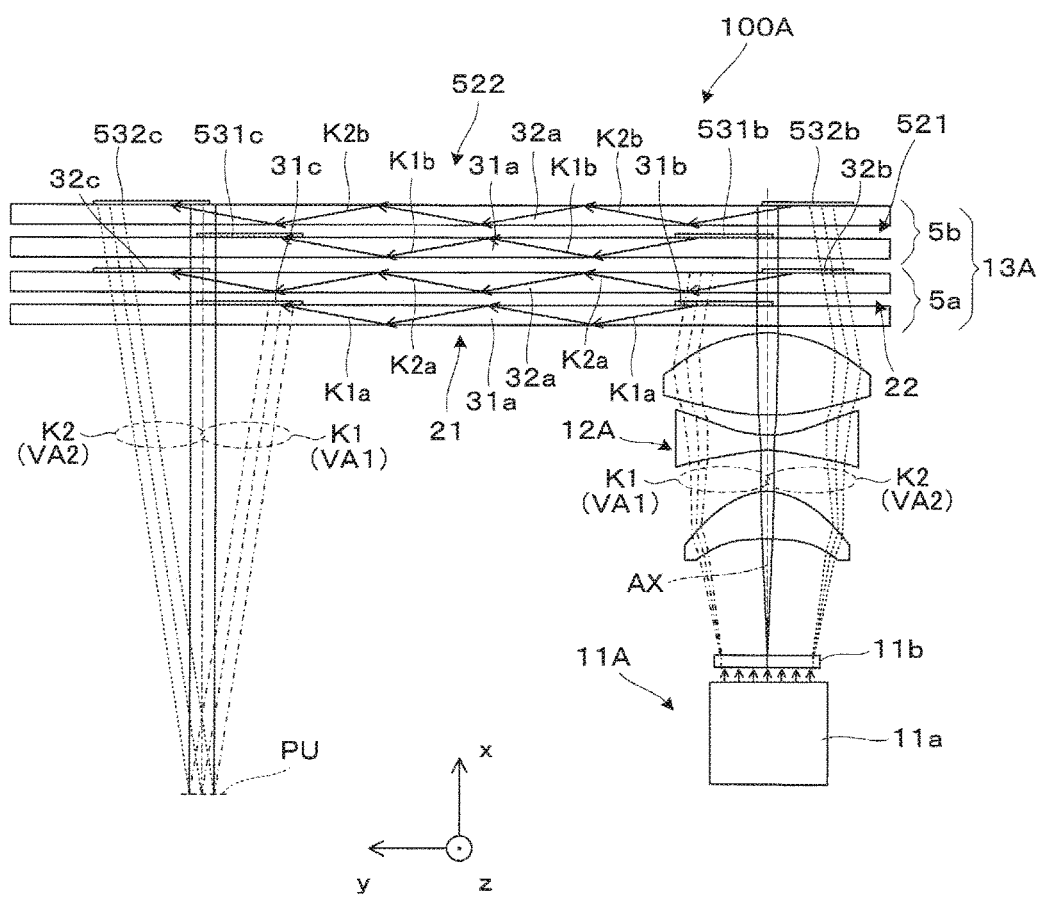
FIG. 12 is a plan view illustrating a virtual image display device according to a fifth embodiment.

FIG. 12 is a diagram illustrating an optical configuration of a virtual image display unit 100A in the virtual image display device of the fifth embodiment. In this case, the display light guiding unit 13A includes a first color member 5a and a second color member 5b. The first color member 5a has substantially the same structure as the display light guiding unit 13A shown in FIG. 2 and the like, and includes the first light guiding unit (first light guiding member) 21 and the second light guiding unit (second light guiding member) 22. However, the first color member 5a is intended for two colors, for example, and separates and guides image light beams K1a and K2a corresponding to the green and blue images into the first light guiding unit 21 and the second light guiding unit 22. Therefore, the incident side diffraction elements 31b and 32b reflect the green and blue image light beams K1a and K2a while diffracting them in the direction of a desired diffraction angle. Here, the image light K1a corresponds to the first angle of view VA1, and the image light K2a corresponds to the second angle of view VA2. Further, the emission side diffraction elements 31c and 32c also reflect and diffract the green and blue image light beams K1a and K2a so as to return to their original directions. The second color member 5b also has substantially the same structure as the display light guiding unit 13A shown in FIG. 2 and the like, and includes a first light guiding unit 521 and a second light guiding unit 522. The second color member 5b is intended for monochrome which is different from the first color member 5a, and for example, separates and guides image light beams K1b and K2b corresponding to the red image into the first light guiding unit 521 and the second light guiding unit 522. Here, the image light K1b corresponds to the first angle of view VA1, and the image light K2b corresponds to the second angle of view VA2. Incident side diffraction elements 531b and 532b diffract the red image light beams K1b and K2b for propagation. In addition, emission side diffraction elements 531c and 532c also diffract the red image light beams K1b and K2b so as to return to their original directions. In the virtual image display unit 100A, the green and blue optical systems are close to each other under conditions such as the diffraction angle, so that a common optical system is used for both colors, but the green and blue optical systems are made further independent of each other, and the display light guiding unit 13A can be made as optical systems for three colors.

Figure 13:
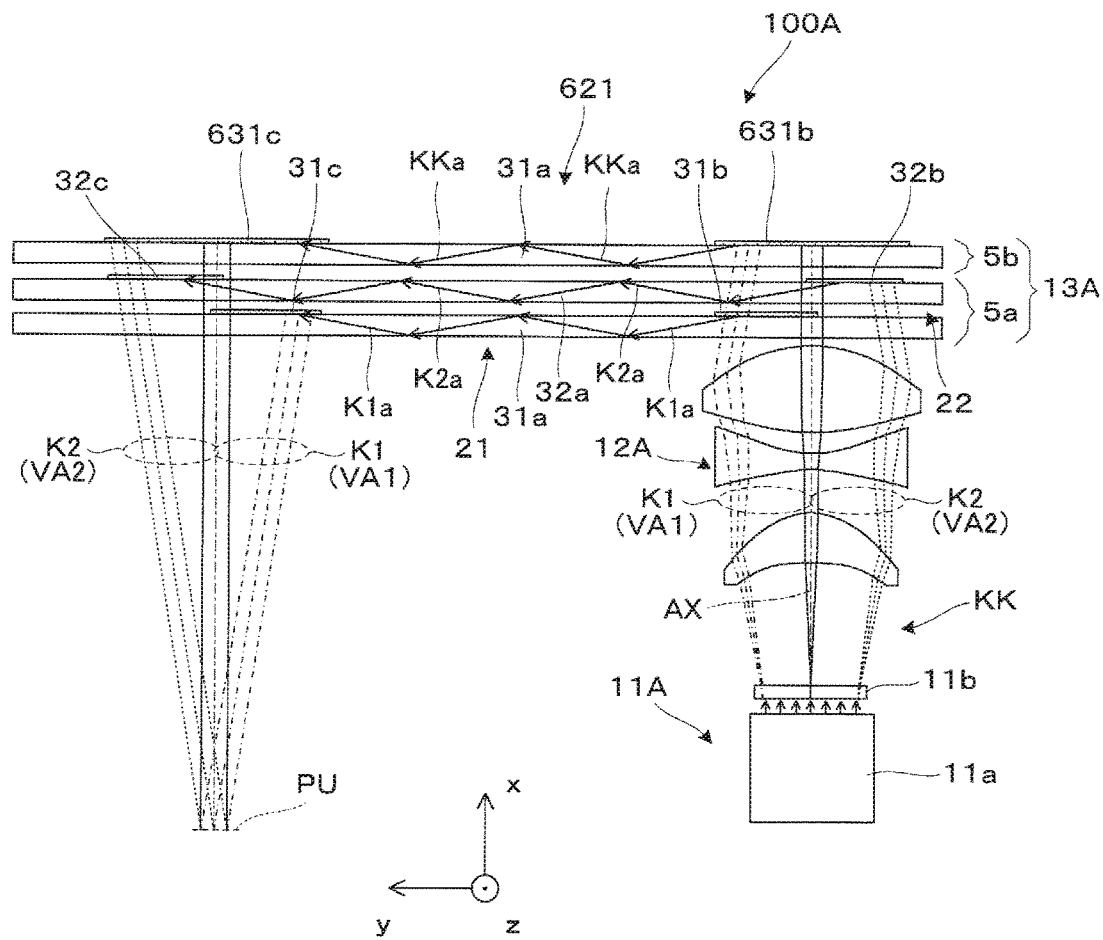
FIG. 13 is a plan view illustrating a modification example of an optical system shown in FIG. 12.

FIG. 13 is a partial modification example of the virtual image display device shown in FIG. 12. In this case, the second color member 5b includes a single light guiding unit 621. In other words, the light guiding unit 621 alone covers the entire angle of view. In the light guiding unit 621, incident side diffraction element 631b diffracts and reflects, for example, red and blue image light beams KKa among the image light beams KK in the direction of a desired diffraction angle, and emission side diffraction element 631c also diffracts and reflects the red and blue image light beams KKa so as to return to their original direction. In this case, the first color member 5a is for monochrome, and splits and guides, for example, the image light beams K1a and K2a corresponding to the green images among the image light beams KK into the first light guiding unit (first light guiding member) 21 and the second light guiding unit (second light guiding member) 22.

Other Modification Examples and the Like

Although the invention has been described with reference to the above embodiments, the invention is not limited to the above embodiments, but can be implemented in various modes without departing from the gist thereof, and for example, the following modification examples are possible.

The display device 11A is not limited to the device including the light modulation panel 11b and the like, but can be a combination of a laser light source and a MEMS or other scanning unit that scans laser light from the laser light source.

Figure 14:
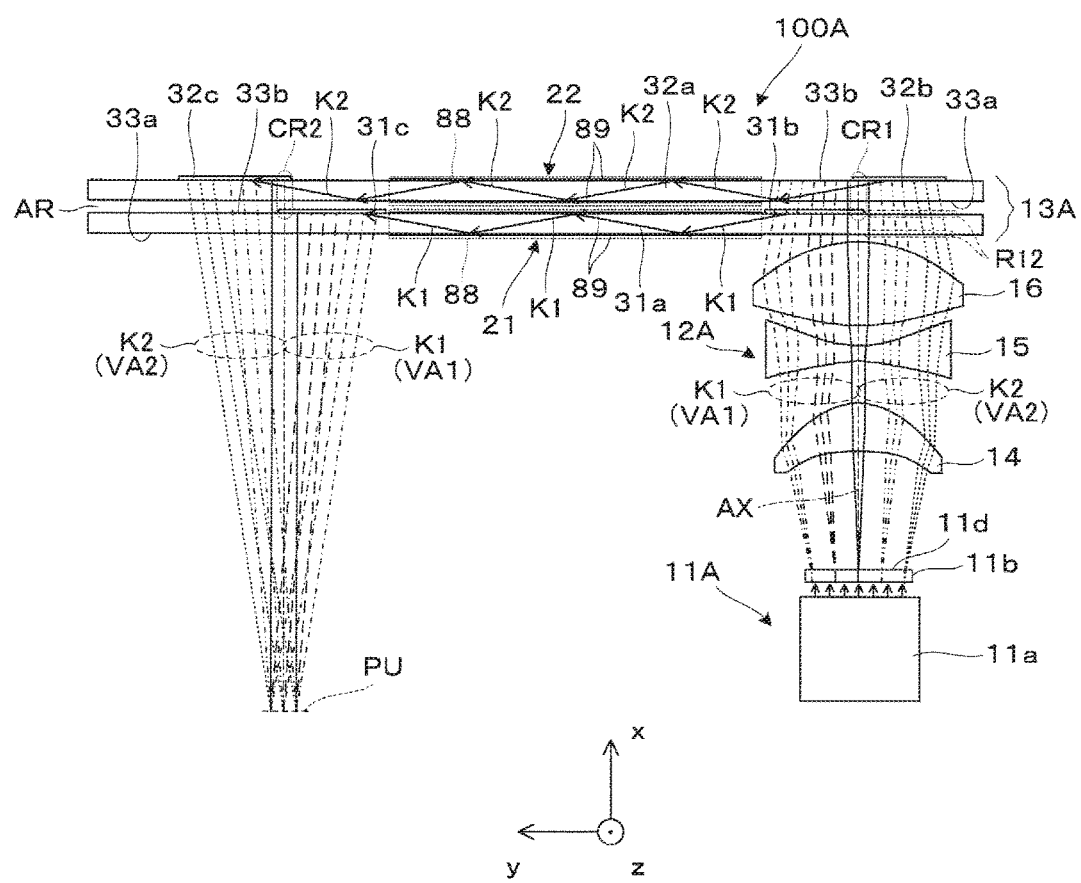
FIG. 14 is a diagram illustrating a modification example.

The surfaces 33a and 33b in a light guiding area 88 of the light guiding plate 31a of the first light guiding unit 21 and the surfaces 33a and 33b in the light guiding area 88 of the light guiding plate 32a of the second light guiding unit 22 are not limited to surfaces that guide light by total reflection using the refractive index difference. Specifically, as shown in FIG. 14, for example, it is possible to form a thin reflecting film 89 made of metal or dielectric, on the surfaces 33a and 33b. Without being limited to those shown, the reflecting film 89 can be formed, for example, only on the outer surface 33b of the light guiding plate 31a and the inner surface 33a of the light guiding plate 32a. At this time, it is also possible to join the light guiding plates 31a and 32a to each other with the reflecting film 89 interposed therebetween.

The display light guiding unit (a light guiding unit for the right eye) 13A is not limited to separate the image light KK by two portions of the first and second light guiding units 21 and 22, but it is also possible to separate the image light KK into three or more rays of light.

Figure 15:
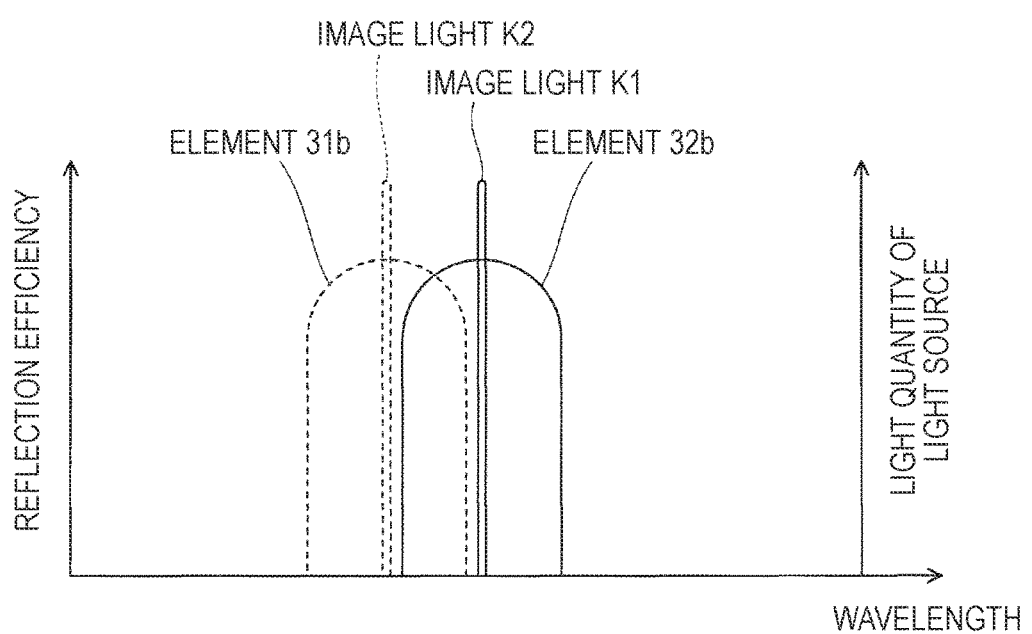
FIG. 15 is a diagram illustrating another modification example.

It is possible to prevent the image light beams K1 and K2 from being influenced from each other, by setting a difference between the wavelengths of the image light beams K1 and K2 to be diffracted by the incident side diffraction elements 31b and 32b. For example, as shown in FIG. 15, it is assumed that there is a difference such that there is no color distinction visually between the wavelength of the image light K1 and the wavelength of the image light K2, if a difference is made in the wavelength characteristics of the reflection efficiency between the incident side diffraction element 31b of the first light guiding unit 21 and the incident side diffraction element 31b of the second light guiding unit 22, it is possible to prevent both image light beams K1 and K2 from being influenced from each other or interfered with each other. Specifically, for example, in the fifth embodiment of FIG. 12, in a case where the image light beams K1a and K2a guided by the first color member 5a are set to red and blue, and the image light beams K1b and K2b guided by the second color member 5b are set to green, a slight wavelength difference is provided for the image light beams K1b and K2b incident on the second color member 5b, and the reflection efficiency of the incident side diffraction element 531b constituting the second color member 5b with respect to the image light K2b is made sufficiently lower than the reflection efficiency with respect to the image light K1b, while the reflection efficiency of the incident side diffraction element 532b constituting the second color member 5b with respect to the image light K1b is made sufficiently lower than the reflection efficiency with respect to the image light K2*b*. Thereby, it is possible to prevent the image light beams K1*b* and K2*b* from being influenced from each other to deteriorate the image.

In each embodiment described above, it is possible to appropriately set the diffraction angle by the hologram element which is the diffraction element or the propagation angle in the light guiding plate to be different for each color of the image light KK.

In the above description, it is assumed that the light of each color constituting the image light KK from any pixel is incident on the first and second light guiding units 21 and 22 at substantially the same angle by the projection optical system 12A, but the angles of incidence of the image light KK on the light guiding units 21 and 22 or the light guiding plates 31*a* and 32*a* can be adjusted to be different for each color. In this case, even in a case where hologram elements of respective colors which are diffraction elements are manufactured by, for example, RGB simultaneous exposure, the diffracted light beams or the propagation angles from the hologram elements of respective colors can be easily matched. Further, it is also possible to adjust the diffracted light or propagation angle according to the critical angle of each color at the light guiding plates 31*a* and 32*a*, and also in this case, the angles of incidence of the image light KK on the light guiding units 21 and 22 or the light guiding plates 31*a* and 32*a* can be adjusted to be different for each color.

In the above description, the images are separated in the left and right horizontal directions by the first and second light guiding units 21 and 22. However, if the display light guiding unit 13A is disposed so as to extend upward and downward with respect to the display device 11A, the image can be separated in upper and lower vertical directions and combined. In this case, it can be considered to rotate the first and second light guiding units 21 and 22 by 90° around the x axis.

In the above description, a see-through type virtual image display device is described, but when it is not necessary to observe the external image, the outside of the display light guiding unit 13A can be covered with a light shielding body.

Figure 16:
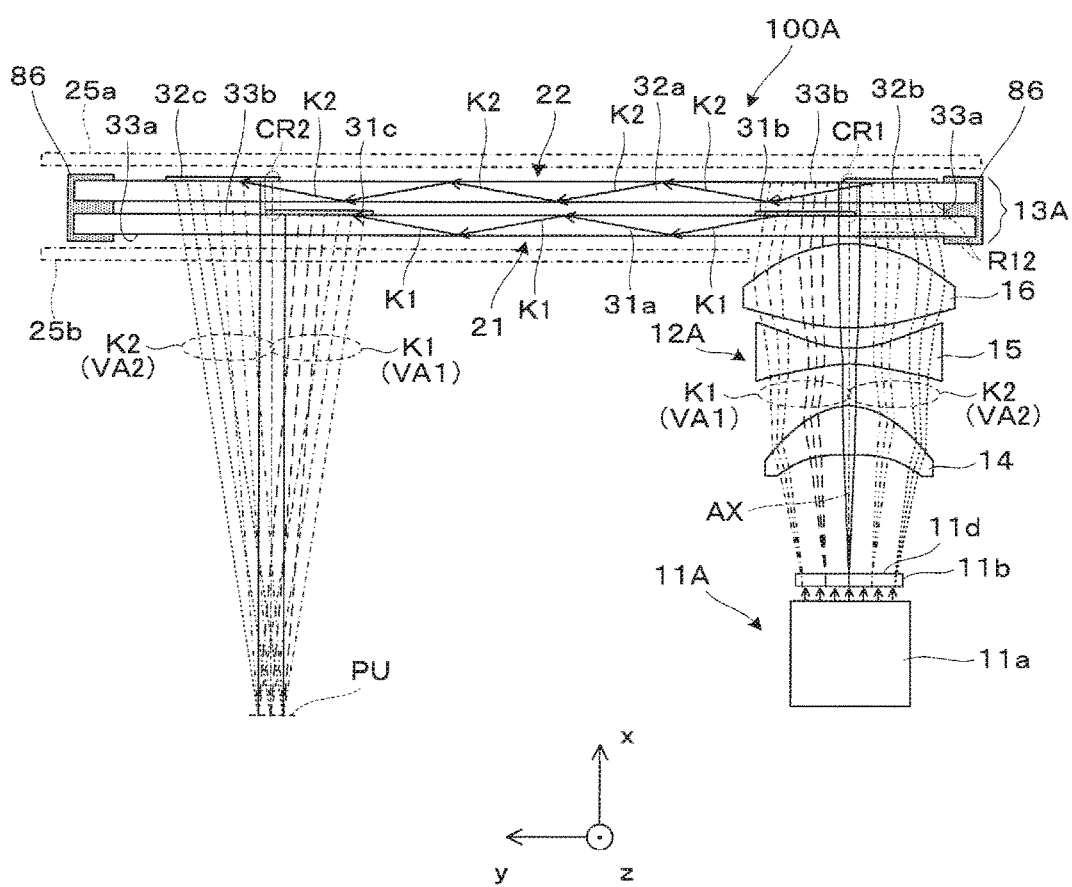
FIG. 16 is a diagram illustrating still another modification example.

In the above embodiment, as a supporter for fixing the light guiding plates 31*a* and 32*b* constituting the light guiding units (light guiding members) 21 and 22 to each other, for example, it is conceivable to support the left and right ends of the light guiding plates 31*a* and 32*b* in the ±y direction. At that time, it is conceivable that the image light incident on both ends of each of the light guiding plates 31*a* and 32*b* returns to the original light guiding plate side at an angle not intended, or the image light is incident again on the light guiding plates provided in the other virtual image display unit 100B. FIG. 16 shows an example in which a supporter 86 that fixes the light guiding plates 31*a* and 32*b* at both ends is formed by a light shielding body to prevent such a stray light from occurring. The supporter 86 is a light absorber that absorbs the image light beams K1 and K2, and may have a light absorption layer on the surface.

In the above description, the virtual image display device 100 of the embodiment has been described as the head mount display, but the virtual image display device 100 is not limited to the eye glasses-type worn by the observer KA, and can also be applied to a head-up display.

In the above description, the virtual image display device 100 includes the pair of virtual image display units 100A and 100B corresponding to both the right eye and the left eye, but a virtual image display unit may be provided only for either the right eye or the left eye so that the image is viewed with a single eye.

The entire disclosure of Japanese Patent Application No. 2016-192989, filed Sep. 30, 2016 is expressly incorporated by reference herein.

What is claimed is:

1. A virtual image display device comprising:
a display light guiding unit; and
an image forming unit that emits image light to the display light guiding unit,
wherein the display light guiding unit includes a first light guiding unit that guides image light corresponding to a first angle of view, and a second light guiding unit that guides image light corresponding to a second angle of view, among angles of view of image light emitted from the image forming unit,
wherein the first light guiding unit and the second light guiding unit each include an incident side diffraction element that takes the image light inside, and an emission side diffraction element that emits the image light outside,
wherein the incident side diffraction elements of the first and second light guiding units are offset from one another in a direction in which light can propagate in the first and second light guiding units,
wherein a pair of the incident side diffraction elements of the first and second light guiding units, or a pair of the emission side diffraction elements of the first and second light guiding units have a common area for diffracting common image light, and
wherein an addition value of diffraction efficiencies of the pair of diffraction elements in the common area is adjusted so as to be approximately equal to a diffraction efficiency of a single one of the pair of diffraction elements in a non-common area.

2. The virtual image display device according to claim 1, wherein the display light guiding unit is formed of a single light guiding member, and
wherein in the single light guiding member, transmission type diffraction elements are provided as the incident side diffraction element and the emission side diffraction element of the first light guiding unit on an observer side, and reflection type diffraction elements are provided as the incident side diffraction element and the emission side diffraction element of the second light guiding unit on the outside.

3. The virtual image display device according to claim 1, wherein the display light guiding unit includes a first light guiding member provided with the first light guiding unit, and a second light guiding member provided with the second light guiding unit.

4. The virtual image display device according to claim 3, wherein at least one of an air layer and a low refractive index layer is provided on surfaces of the first light guiding member and the second light guiding member.

5. The virtual image display device according to claim 1, wherein in order to collectively input image light to both the first and second light guiding units, a single image forming unit as the image forming unit, and a single projection optical system corresponding to the single image forming unit are provided.

6. The virtual image display device according to claim 1, wherein in order to individually input image light to each of the first and second light guiding units, a pair of image forming units as the image forming unit, and a pair of projection optical systems corresponding to the pair of image forming units are provided.

7. The virtual image display device according to claim 1, wherein in order to input image light to each of the first and second light guiding units, a pair of image forming units as the image forming unit, and a single projection optical system corresponding to the pair of image forming units are provided.

8. The virtual image display device according to claim 1, wherein the first and second angles of view are respectively set between 20° and 45°.

9. The virtual image display device according to claim 1, wherein the first and second light guiding units separate the angle of view of image light of at least one of three colors of red, green, and blue into the first angle of view and the second angle of view, and guide the image light.

10. The virtual image display device according to claim 1, wherein the incident side diffraction element and the emission side diffraction element of each of the first and second light guiding units are holograms.

11. The virtual image display device according to claim 1, wherein the incident side diffraction element and the emission side diffraction element of each of the first and second light guiding units are diffraction gratings.

12. The virtual image display device according to claim 1, wherein in order to individually input image light to each of the first and second light guiding units, a pair of image forming units as the image forming unit, and a pair of projection optical systems corresponding to the pair of image forming units are provided, and
wherein in the image forming unit, luminance of the image light of the common area is adjusted.

13. The virtual image display device according to claim 1, wherein two diffraction elements in the common area have a substantially same angle of incidence.

14. The virtual image display device according to claim 1, wherein a light guiding unit for a left eye and a light guiding unit for a right eye which guide the image light to the left and right eyes of an observer are provided as the display light guiding unit, and
wherein diffraction efficiency is adjusted by the light guiding unit for the left eye and the light guiding unit for the right eye such that the diffraction efficiency in a case where the image light is observed by the observer becomes substantially uniform.

15. The virtual image display device according to claim 1, wherein the incident side diffraction element and the emission side diffraction element of each light guiding unit are located on a same surface of the light guiding unit.

* * * * *